US012693156B2

(12) United States Patent
Fujisaki et al.

(10) Patent No.: US 12,693,156 B2
(45) Date of Patent: Jul. 28, 2026

(54) LIGHT DETECTION APPARATUS AND METHOD OF MANUFACTURING THE SAME

(71) Applicant: SONY SEMICONDUCTOR SOLUTIONS CORPORATION, Kanagawa (JP)

(72) Inventors: Yutaro Fujisaki, Kanagawa (JP); Tomoharu Ogita, Kanagawa (JP); Shigehiro Ikehara, Kanagawa (JP); Yoshiyuki Ohba, Kumamoto (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 221 days.

(21) Appl. No.: 18/681,967

(22) PCT Filed: Apr. 21, 2022

(86) PCT No.: PCT/JP2022/018349
§ 371 (c)(1),
(2) Date: Feb. 7, 2024

(87) PCT Pub. No.: WO2023/021787
PCT Pub. Date: Feb. 23, 2023

(65) Prior Publication Data
US 2025/0123144 A1      Apr. 17, 2025

(30) Foreign Application Priority Data
Aug. 16, 2021    (JP) ................................. 2021-132445

(51) Int. Cl.
*G01J 1/44*          (2006.01)

(52) U.S. Cl.
CPC ......... *G01J 1/44* (2013.01); *G01J 2001/4466* (2013.01)

(58) Field of Classification Search
CPC ............................ G01J 1/44; G01J 2001/4466
See application file for complete search history.

(56) References Cited

U.S. PATENT DOCUMENTS 6,344,668 B1    2/2002  Hatano et al.
10,811,453 B1   10/2020  Mun
(Continued)

FOREIGN PATENT DOCUMENTS

EP          4071817 A1    10/2022
JP          H11-330440        11/1999
(Continued)

OTHER PUBLICATIONS

English Translation of International Search Report prepared by the Japan Patent Office on Jul. 11, 2022, for International Application No. PCT/JP2022/018349, 3 pgs.

*Primary Examiner* — Georgia Y Epps
*Assistant Examiner* — Don J Williams
(74) *Attorney, Agent, or Firm* — SHERIDAN ROSS P.C.

(57) ABSTRACT

What is provided is a light detection apparatus along with a method of manufacturing the same, the apparatus being adapted to improve both the light blocking effect between pixels and the photoelectric conversion efficiency of each pixel. The light detection apparatus of this disclosure includes a substrate, a plurality of photoelectric conversion units provided inside the substrate, and a light blocking film provided at least between the photoelectric conversion units inside the substrate. The light blocking film includes a first film provided inside the substrate and a second film provided inside the substrate via the first film. The light absorption rate of the second film is higher than that of the first film.

20 Claims, 17 Drawing Sheets

(56) References Cited

U.S. PATENT DOCUMENTS

| | | |
|---|---|---|
| 2016/0049430 A1 | 2/2016 | Nomura |
| 2019/0006399 A1 | 1/2019 | Otake |
| 2020/0286946 A1 | 9/2020 | Mandai |
| 2021/0183930 A1 | 6/2021 | Takatsuka |
| 2022/0140014 A1* | 5/2022 | Shim .................... H10K 50/858 |
| | | 257/40 |

FOREIGN PATENT DOCUMENTS

| | | |
|---|---|---|
| JP | 2014-131083 | 7/2014 |
| JP | 2018-201005 | 12/2018 |
| JP | 2019-114728 | 7/2019 |
| JP | 2020-077650 | 5/2020 |
| JP | 2020-080418 | 5/2020 |
| TW | 202127644 A | 7/2021 |
| WO | WO 2014/156933 | 10/2014 |
| WO | WO 2021/112098 | 6/2021 |
| WO | WO 2021/157174 | 8/2021 |

* cited by examiner

FIG.3
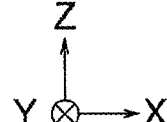
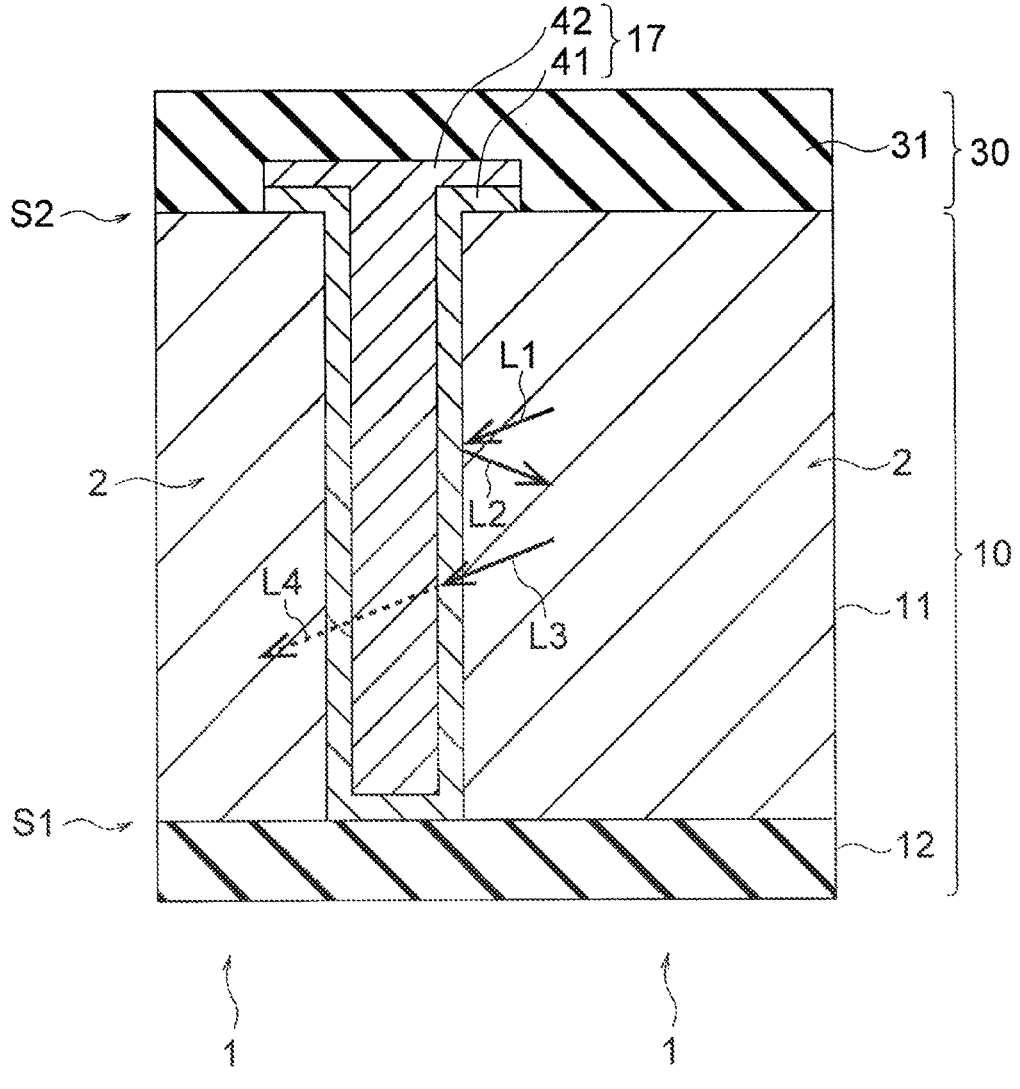

FIG.8
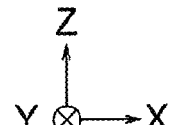
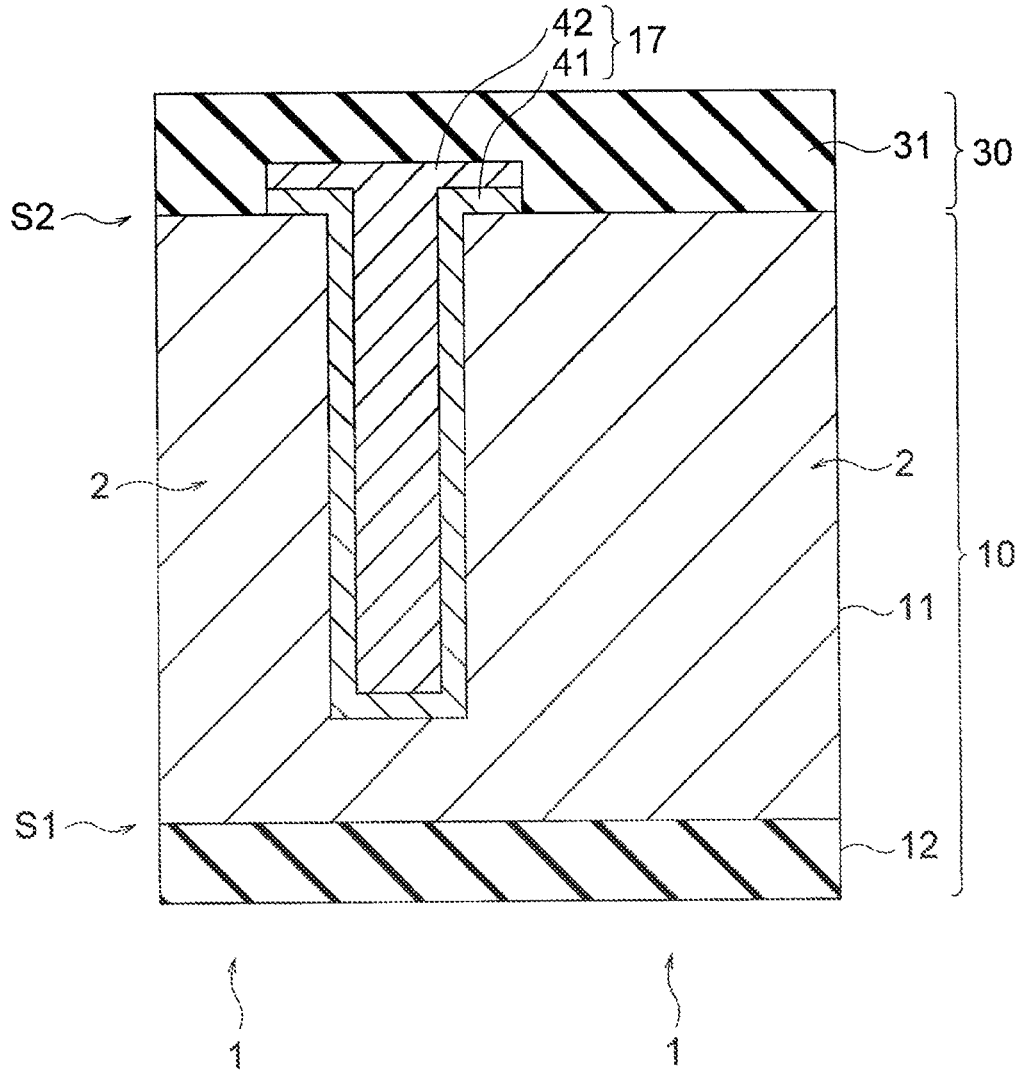

FIG.9
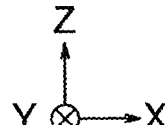
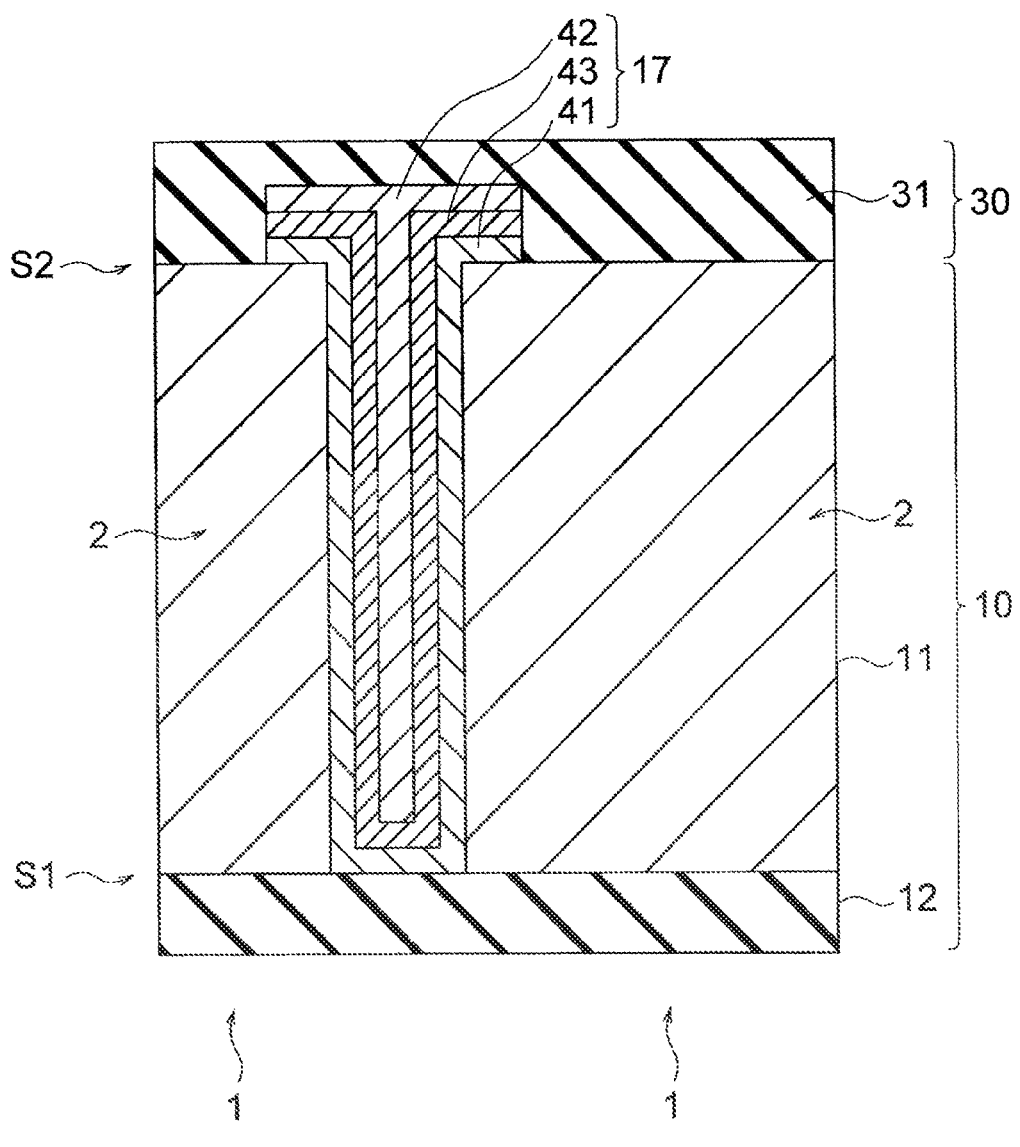

FIG.10
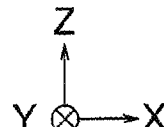
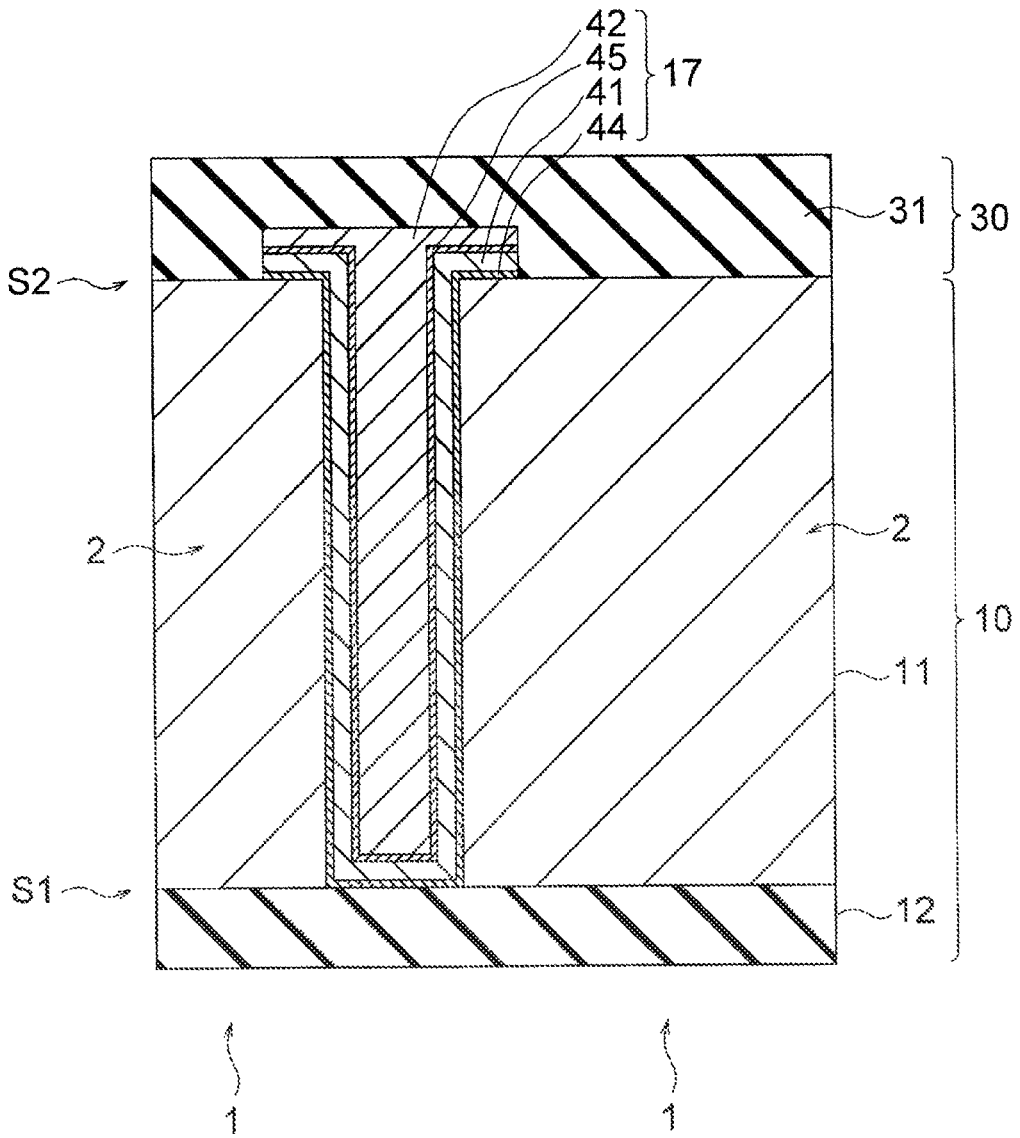

F I G . 1 3

F I G . 1 4
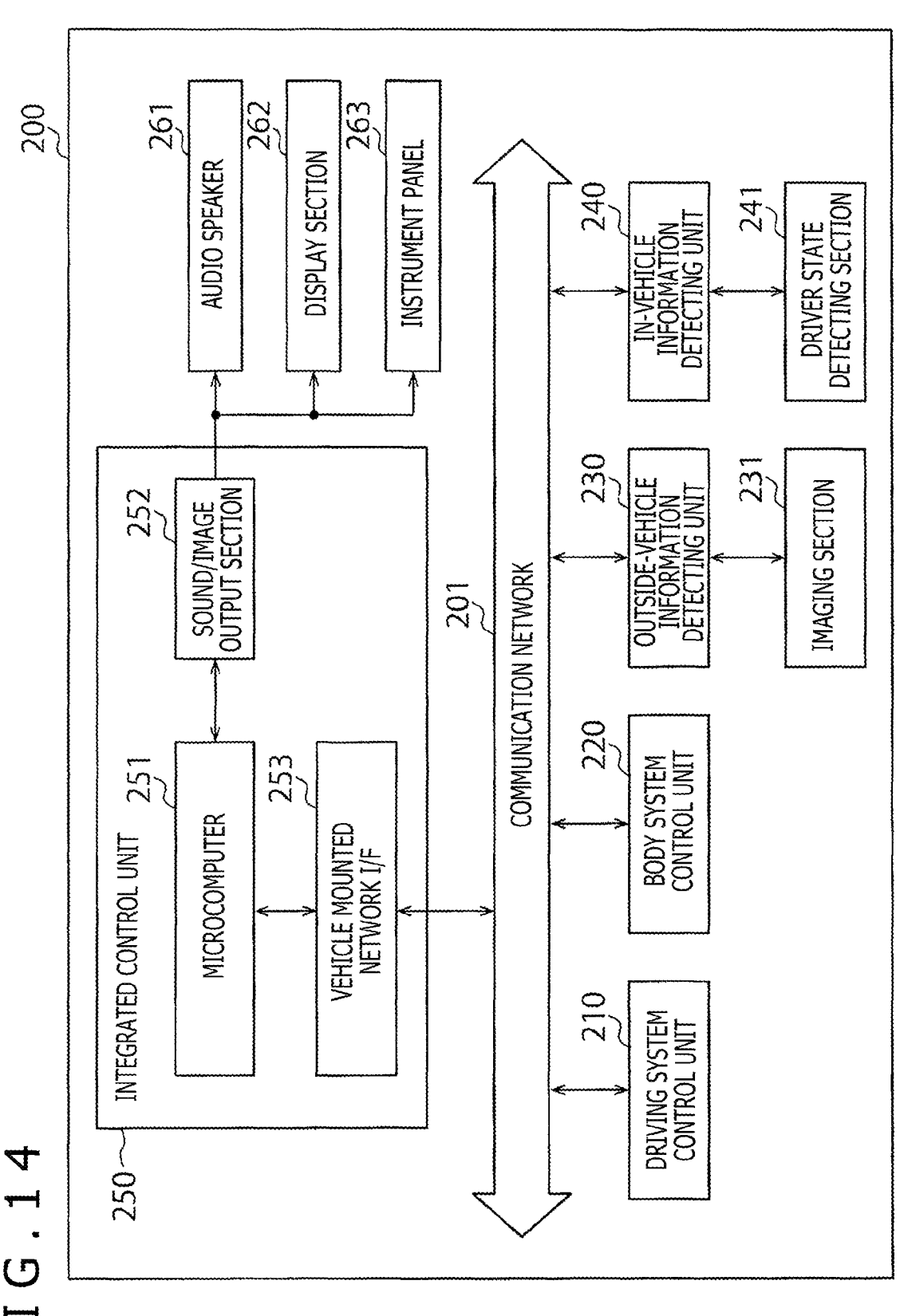

LIGHT DETECTION APPARATUS AND METHOD OF MANUFACTURING THE SAME

CROSS REFERENCE TO RELATED APPLICATIONS

This application is a national stage application under 35 U.S.C. 371 and claims the benefit of PCT Application No. PCT/JP2022/018349, having an international filing date of 21 Apr. 2022, which designated the United States, which PCT application claimed the benefit of Japanese Patent Application No. 2021-132445, filed 16 Aug. 2021, the entire disclosures of each of which are incorporated herein by reference.

TECHNICAL FIELD

The present disclosure relates to a light detection apparatus and a method of manufacturing the same.

BACKGROUND ART

In light detection apparatuses having photoelectric conversion units such as SPAD (Single Photon Avalanche Diode) devices, a light blocking film is embedded in trenches formed inside a substrate that includes the photoelectric conversion units. The embedded light blocking film reduces light leaks between pixels and thereby suppresses color mixing therebetween.

CITATION LIST

Patent Literature

PTL 1: Japanese Patent Laid-open No. 2018-201005
PTL 2: Japanese Patent Laid-open No. 2020-080418
PTL 3: Japanese Patent Laid-open No. 2020-077650

SUMMARY

Technical Problem

The light blocking film may be formed with a metal film such as a W (tungsten) film or an Al (aluminum) film. In the case where the light blocking film is the W film, however, a high light absorption rate (emissivity) of the W film causes the W film to absorb light, which lowers the efficiency of photoelectric conversion of the photoelectric conversion units. This can be a significant disadvantage in a case where the photoelectric conversion units in use perform photoelectric conversion of near-infrared light as in the case of the SPAD devices.

On the other hand, in the case where the light blocking film is the Al film, a low light absorption rate of the Al film suppresses reductions in the efficiency of photoelectric conversion. However, the Al film is formed in a manner including a crystal grain boundary where the Al film is not fully formed. As a result, in a case where the light blocking film is the Al film, there is a possibility that the light of a given pixel can leak out into another pixel via the crystal grain boundary in the Al film, with color mixing taking place between these pixels.

The present disclosure thus provides a light detection apparatus capable of improving both the light blocking effect between pixels and the photoelectric conversion efficiency of each pixel, as well as a method of manufacturing the light detection apparatus.

Solution to Problem

According to a first aspect of the present disclosure, there is provided a light detection apparatus including a substrate, a plurality of photoelectric conversion units provided inside the substrate, and a light blocking film provided at least between the photoelectric conversion units inside the substrate. The light blocking film includes a first film provided inside the substrate and a second film provided inside the substrate via the first film. The light absorption rate of the second film is higher than that of the first film. In this configuration, for example, the first film reduces the absorption of light by the light blocking film, and the light passing through the first film is absorbed by the second film. This makes it possible to improve both the light blocking effect between pixels and the photoelectric conversion efficiency of each pixel.

Further, according to the first aspect, the first film may include a metal film. This makes it possible to implement the light blocking effect of the first film by the metal film, for example.

Also according to the first aspect, the first film may include either Al (aluminum) or Cu (copper). This makes it possible to set a lower light absorption rate for the first film, for example.

Also according to the first aspect, the film thickness of the first film may be at least 5 nm. This enables the first film to suitably reflect incident light, for example.

Also according to the first aspect, the second film may include a metal film. This makes it possible to implement the light blocking effect of the second film by the metal film, for example.

Also according to the first aspect, the second film may include W (tungsten), Ti (titanium), or Cr (chromium). This makes it possible to set a higher light absorption rate for the second film, for example.

Also according to the first aspect, the second film may be provided over the top surface and on the side of the first film inside the substrate. This allows the first film to cover the bottom surface and the side of the second film, for example.

Also according to the first aspect, the light blocking film may be provided inside the substrate in a manner penetrating therethrough. This enables the light blocking film inside a through trench to improve both the light blocking effect between the pixels and the photoelectric conversion efficiency of each pixel, for example.

Also according to the first aspect, the light blocking film may be provided inside the substrate in a manner not penetrating therethrough. This enables the light blocking film inside a non-through trench to improve both the light blocking effect between the pixels and the photoelectric conversion efficiency of each pixel, for example.

Also according to the first aspect, the light blocking film may further include a third film interposed between the first film and the second film. This makes it possible to avoid contact between the first film and the second film, for example.

Also according to the first aspect, the third film may include either an insulating film or a metal film. This allows the third film with its suitable characteristics to avoid contact between the first film and the second film, for example.

Also according to the first aspect, the light blocking film may further include a fourth film and a fifth film, the first film may be provided inside the substrate via the fourth film, and the fifth film may be interposed between the first and film the second film. This makes it possible to avoid contact between a material exposed in the trench and the first film, or between the first film and the second film, for example.

Also according to the first aspect, the fourth film and the fifth film may each function as a barrier metal film. This makes it possible to suppress diffusion of metal atoms from the first film and the second film, for example.

Also according to the first aspect, the substrate may include a first region that includes the plurality of photoelectric conversion units and a second region that circularly surrounds the first region, and the light blocking film may further include a first portion interposed between the first region and the second region inside the substrate and a second portion provided over the second region outside the substrate. This makes it possible to suppress not only the color mixing stemming from light leaks between the pixels in the first region but also the color mixing caused by the reflection of light in the second region, for example.

Also according to the first aspect, the first portion may include the first film provided inside the substrate and the second film provided inside the substrate via the first film, and the second portion may include the first film provided over the substrate and the second film provided over the substrate via the first film. This allows the first film and the second film to form both the light blocking film inside the substrate and the light blocking film outside the substrate, for example.

According to a second aspect of the present disclosure, there is provided a light detection apparatus manufacturing method including forming a plurality of photoelectric conversion units inside a substrate, and forming a light blocking film at least between the photoelectric conversion units inside the substrate. The light blocking film is formed by forming a first film inside the substrate and by forming a second film inside the substrate via the first film. The light absorption rate of the second film is higher than that of the first film. This method allows the first film to reduce the absorption of light by the light blocking film and enables the second film to absorb the light passing through the first film. It is thus possible to improve both the light blocking effect between pixels and the photoelectric conversion efficiency of each pixel, for example.

According to the second aspect, the light blocking film may be formed in a trench formed inside the substrate in a manner penetrating therethrough. This enables the light blocking film inside a through trench to improve both the light blocking effect between the pixels and the photoelectric conversion efficiency of each pixel, for example.

Also according to the second aspect, the light blocking film may be formed in a trench formed inside the substrate in a manner not penetrating therethrough. This enables the light blocking film inside a non-through trench to improve both the light blocking effect between the pixels and the photoelectric conversion efficiency of each pixel, for example.

Also according to the second aspect, the light blocking film may be formed by forming the first film, a third film, and the second film, in that order, inside the substrate. This makes it possible to avoid contact between the first film and the second film, for example.

Also according to the second aspect, the light blocking film may be formed by forming a fourth film, the first film, a fifth film, and the second film, in that order, inside the substrate. This makes it possible to avoid contact between a material exposed in the trench and the first film, or between the first film and the second film, for example.

4

Figure 2:
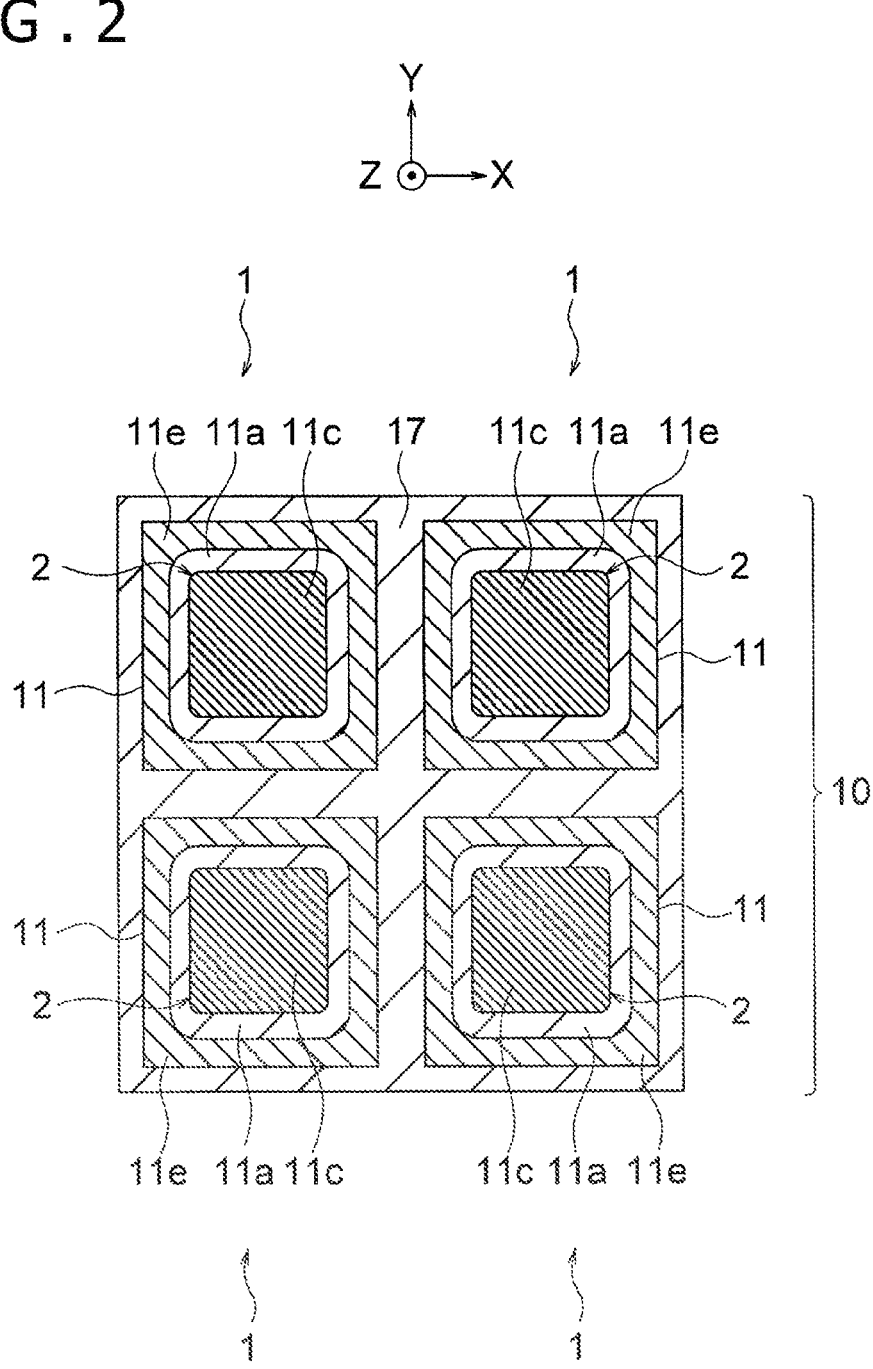

FIG. 2 is a transverse sectional view depicting the structure of the light detection apparatus as the first embodiment.

FIG. 3 is another longitudinal sectional view depicting the structure of the light detection apparatus as the first embodiment.

Figure 4:
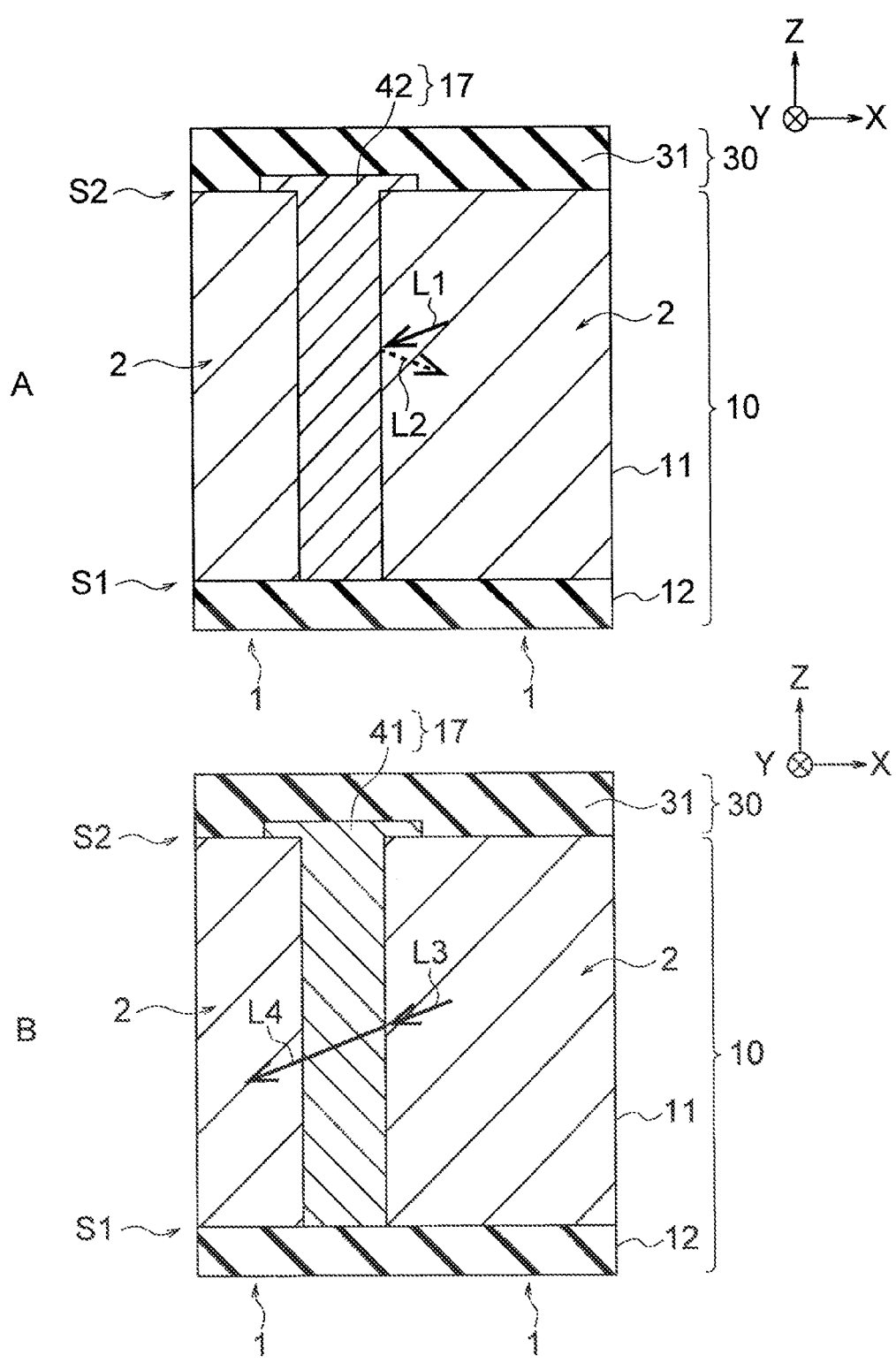

FIG. 4 illustrates longitudinal sectional views depicting the structures of light detection apparatuses as two comparative examples with respect to the first embodiment.

Figure 5:
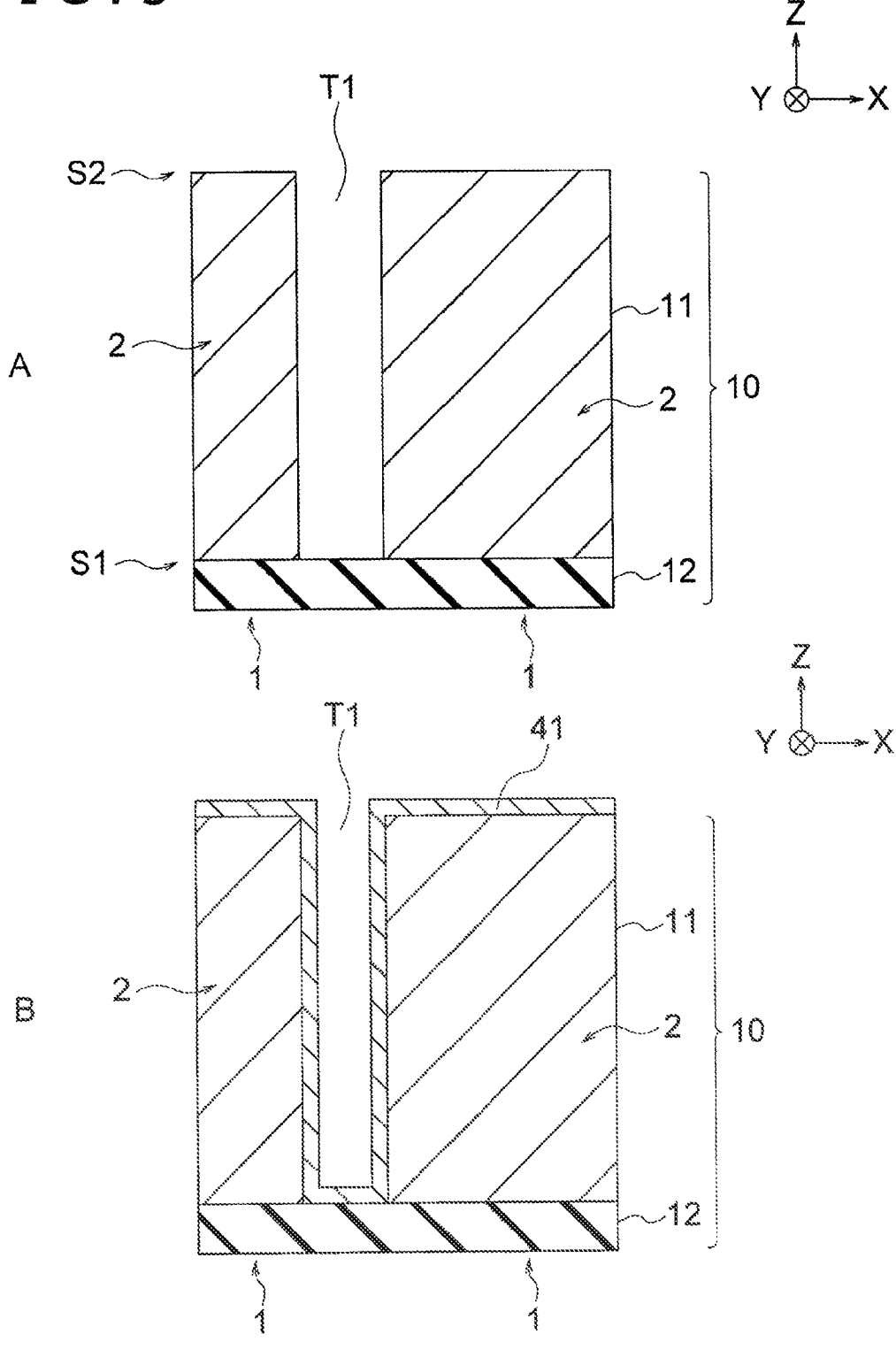

FIG. 5 illustrates longitudinal sectional views (1/2) depicting a method of manufacturing the light detection apparatus as the first embodiment.

Figure 6:
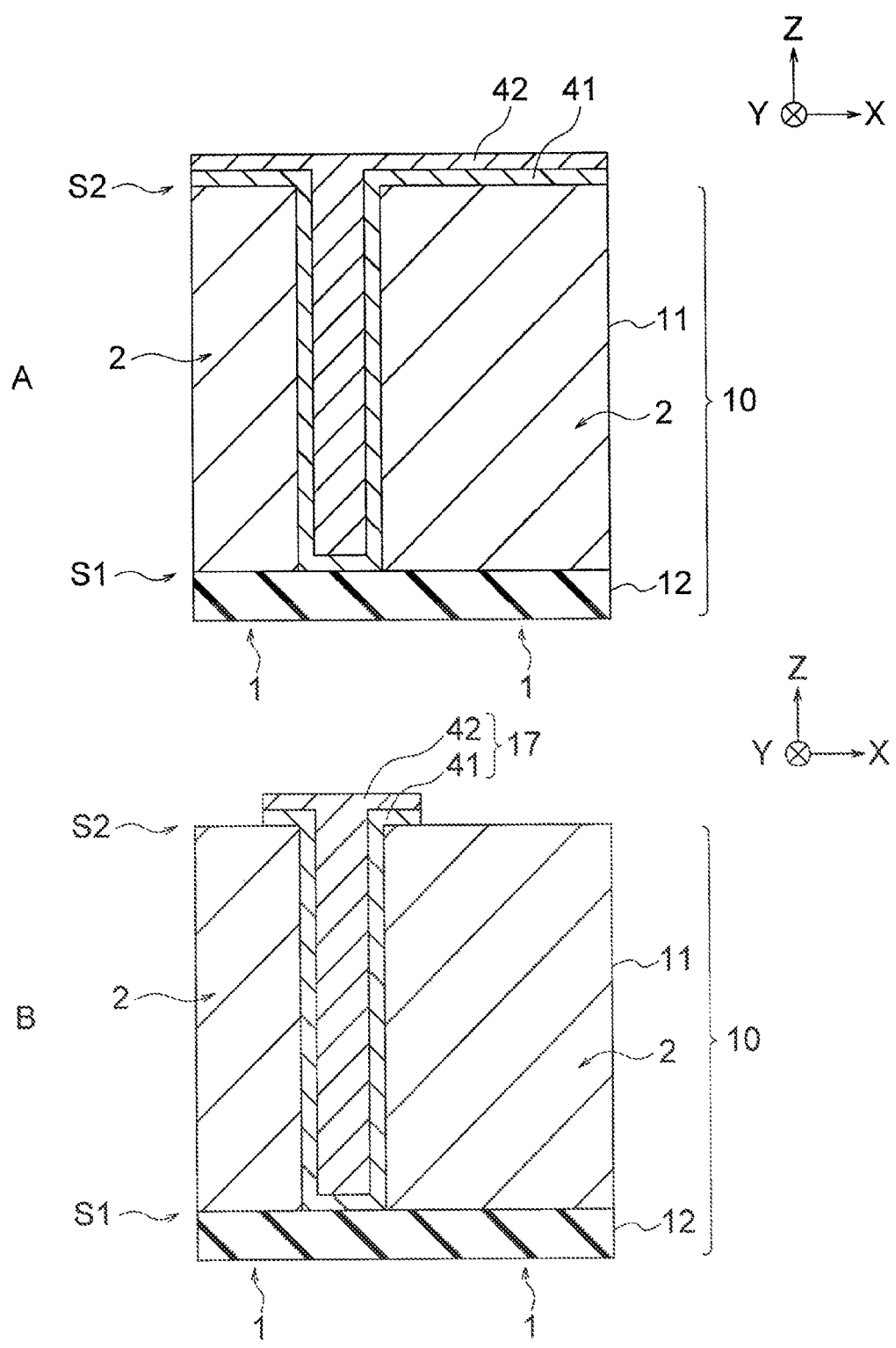

FIG. 6 illustrates longitudinal sectional views (2/2) depicting the method of manufacturing the light detection apparatus as the first embodiment.

Figure 7:
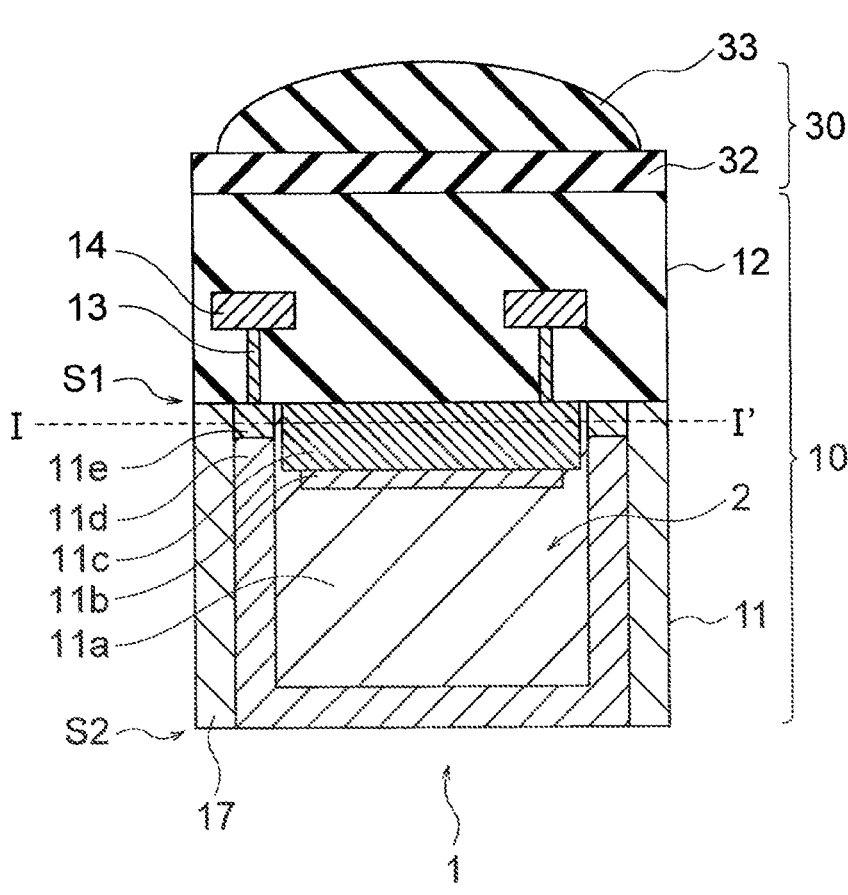

FIG. 7 is a longitudinal sectional view depicting the structure of a light detection apparatus as an alternative example of the first embodiment.

FIG. 8 is a longitudinal sectional view depicting the structure of a light detection apparatus as a second embodiment.

FIG. 9 is a longitudinal sectional view depicting the structure of a light detection apparatus as a third embodiment.

FIG. 10 is a longitudinal sectional view depicting the structure of a light detection apparatus as an alternative example of the third embodiment.

Figure 11:
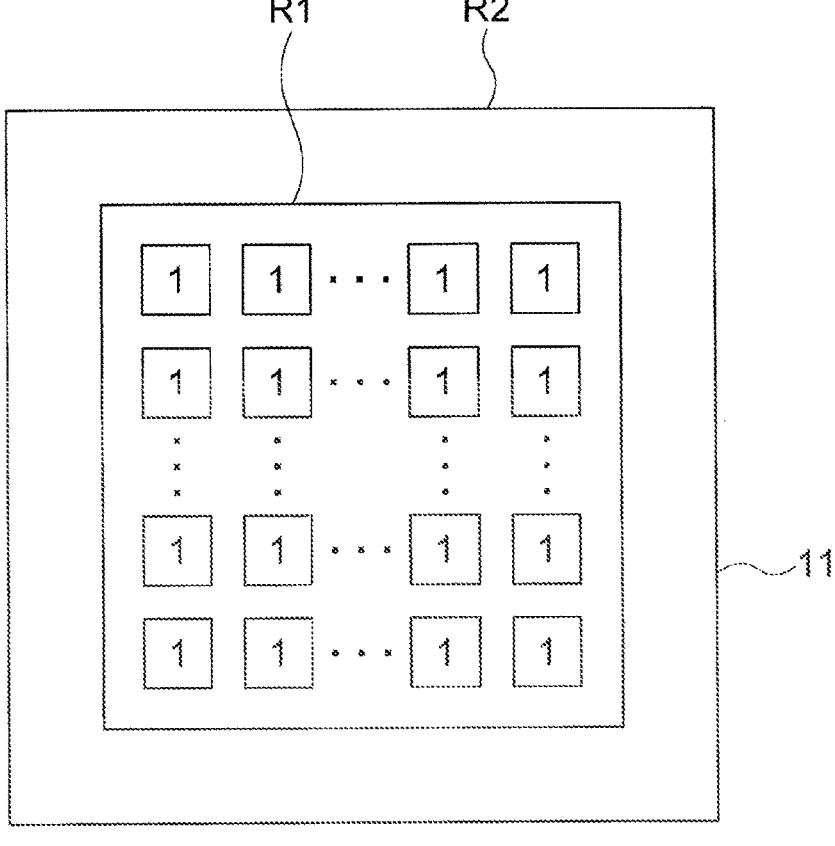

FIG. 11 is a plan view schematically depicting the structure of a light detection apparatus as a fourth embodiment.

Figure 12:
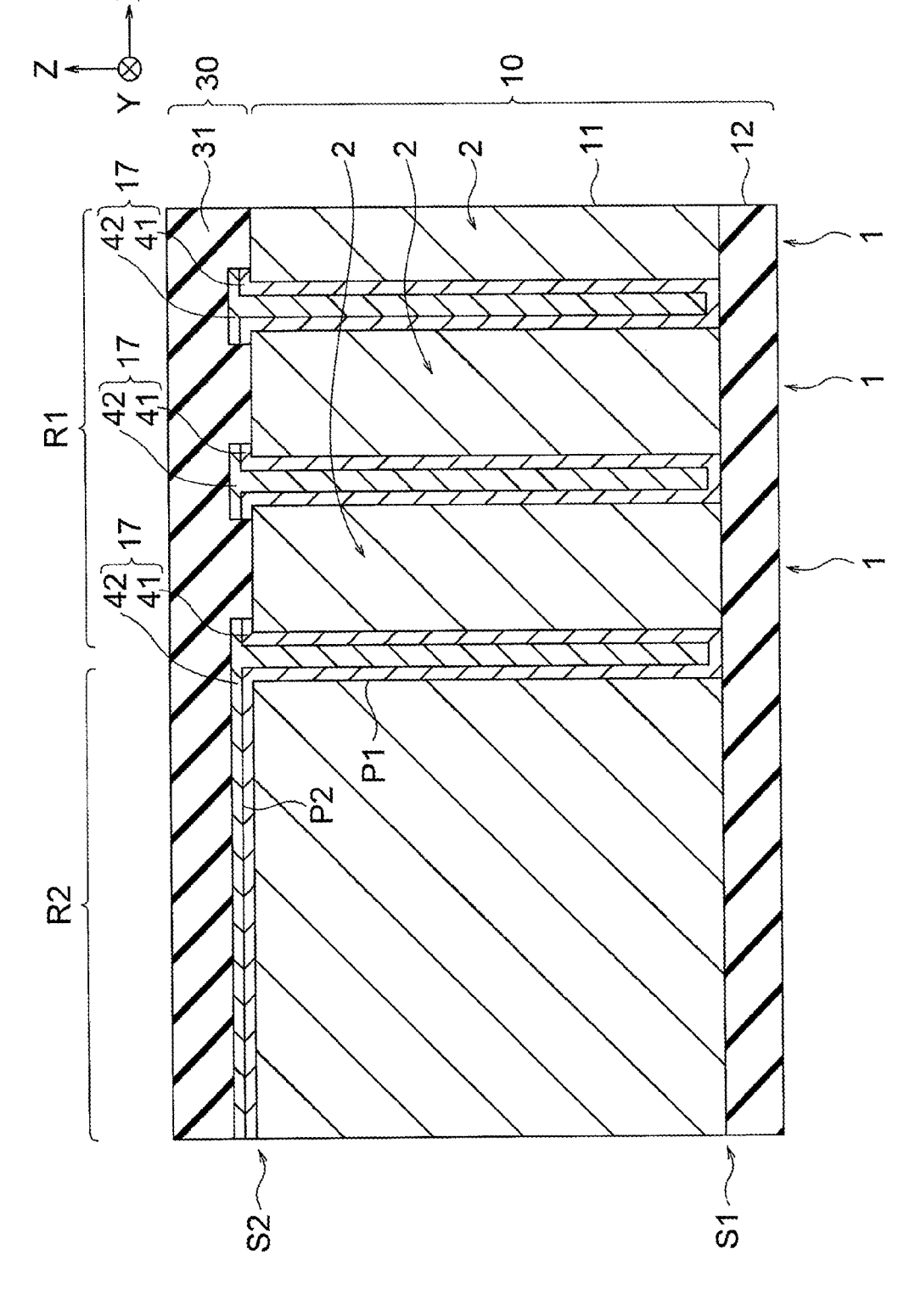

FIG. 12 is a longitudinal sectional view depicting the structure of the light detection apparatus as the fourth embodiment.

FIG. 13 is a block diagram depicting a configuration example of electronic equipment.

FIG. 14 is a block diagram depicting a configuration example of a mobile object control system.

Figure 15:
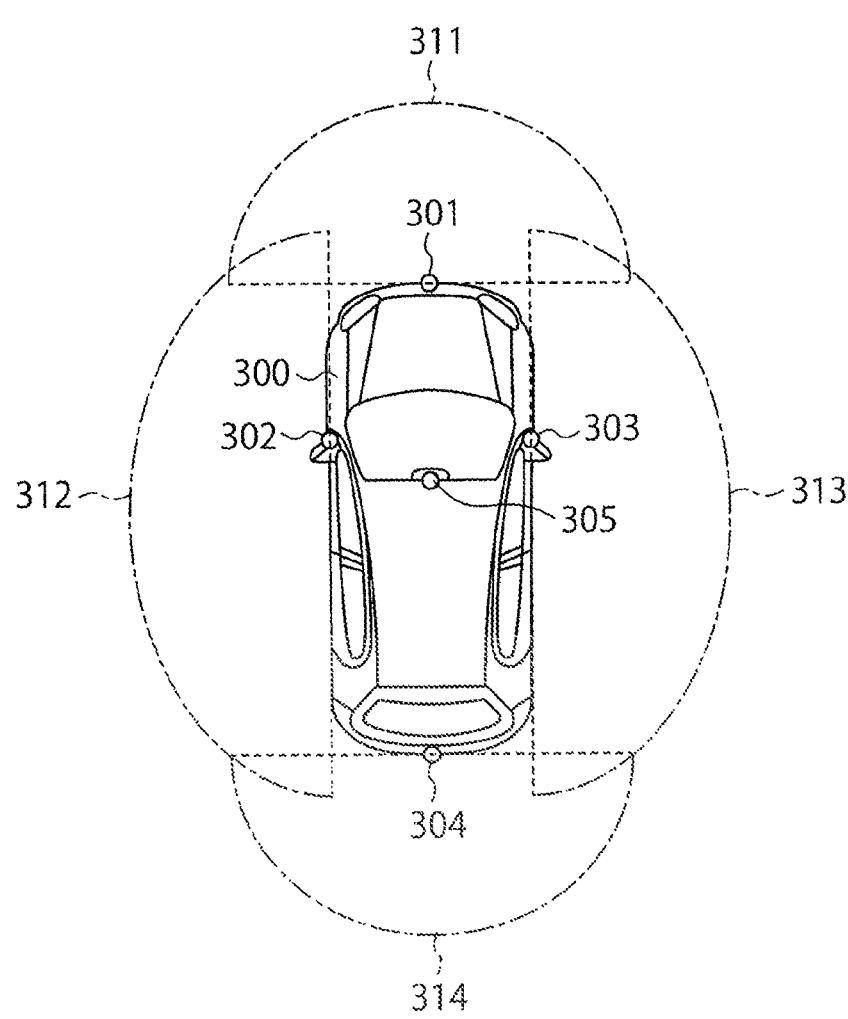

FIG. 15 is a plan view depicting a specific example of positions where an image pickup unit in FIG. 14 is set up.

Figure 16:
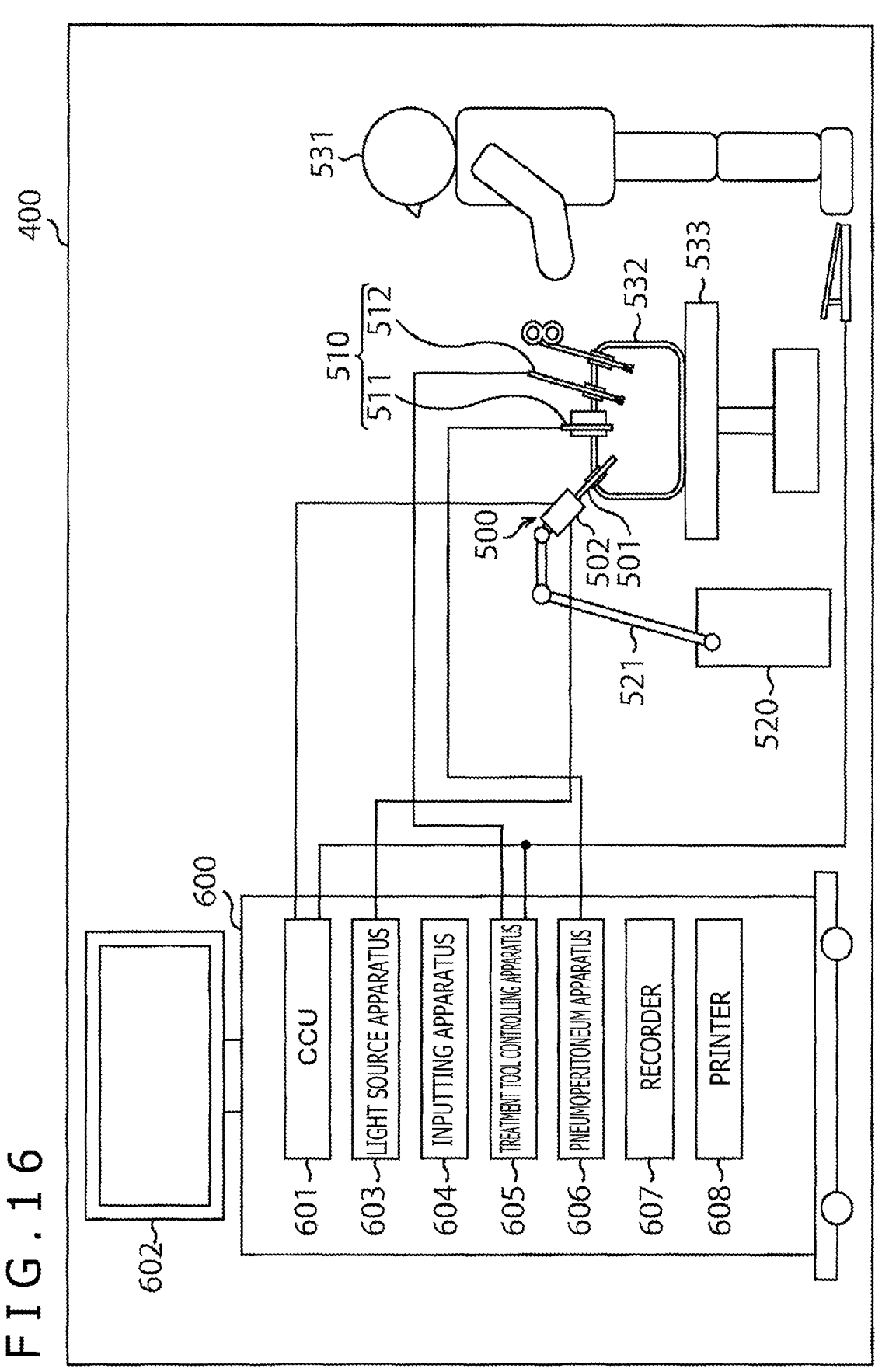

FIG. 16 is a view depicting an example of a schematic configuration of an endoscopic surgery system.

Figure 17:
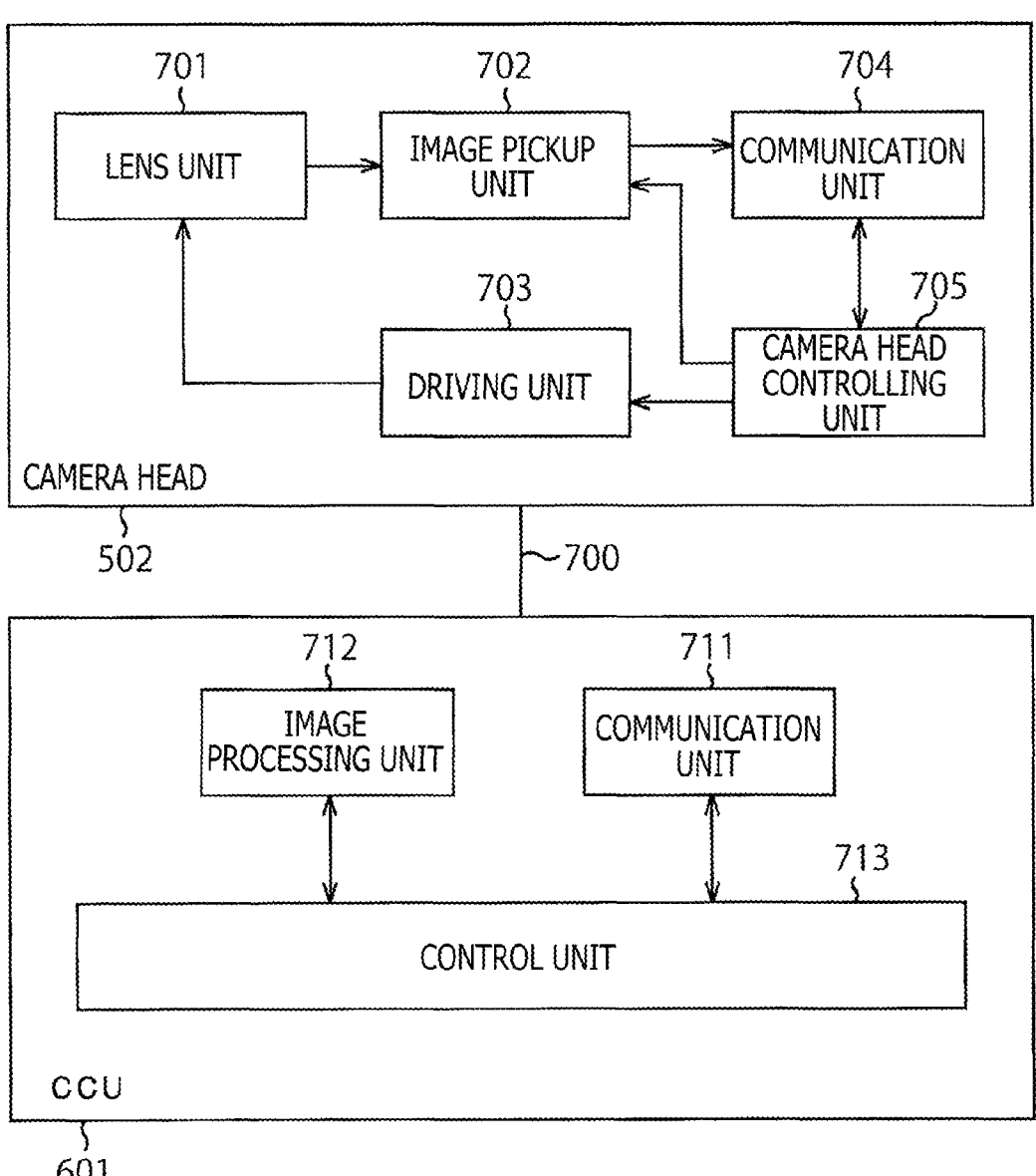

FIG. 17 is a block diagram depicting an example of a functional configuration of a camera head and a camera control unit (CCU).

DESCRIPTION OF EMBODIMENTS

Some preferred embodiments of the present disclosure are described below with reference to the accompanying drawings.

First Embodiment

Figure 1:
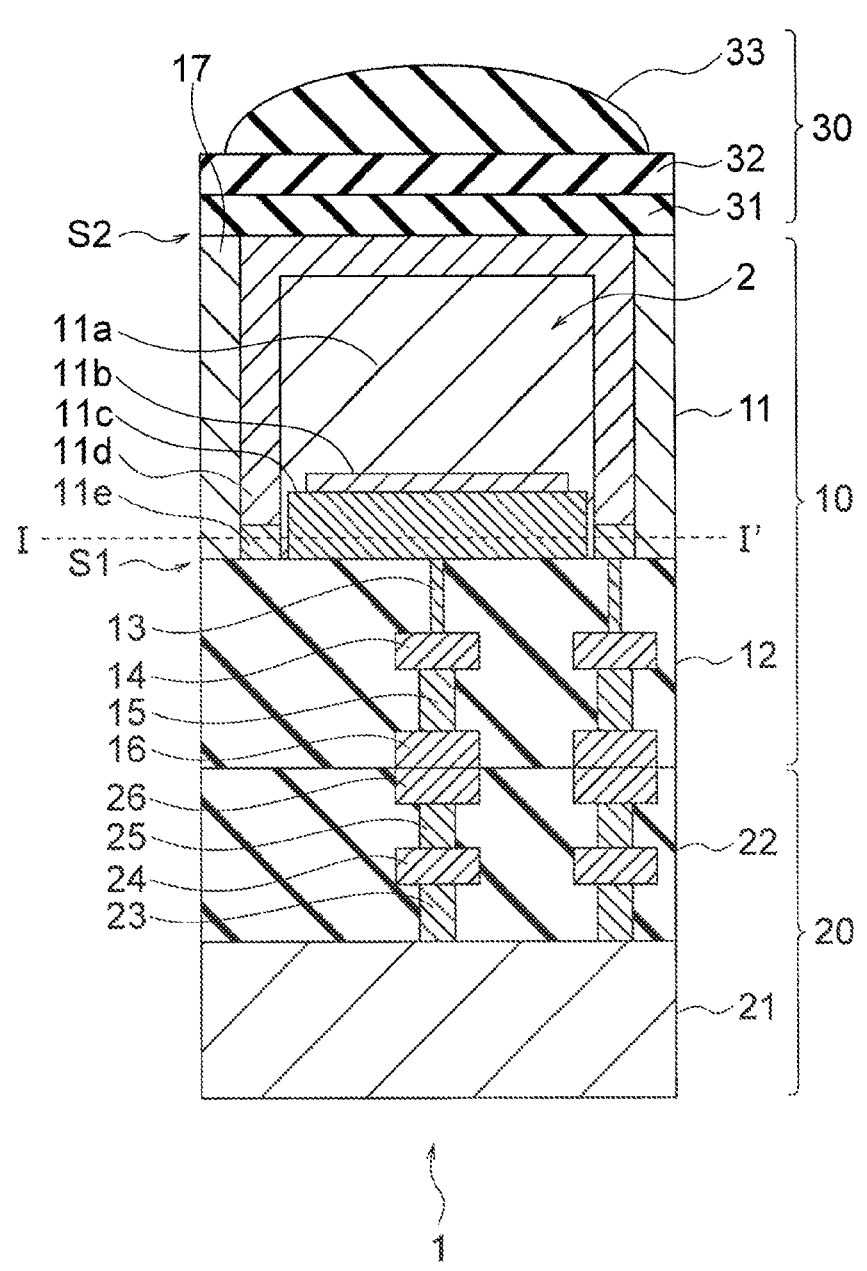
FIG. 1 is a longitudinal sectional view depicting a structure of a light detection apparatus as a first embodiment.

FIG. 1 is a longitudinal sectional view depicting the structure of a light detection apparatus as a first embodiment. FIG. 1 indicates one pixel 1 in the light detection apparatus and one photoelectric conversion unit 2 in the pixel 1. The photoelectric conversion unit 2 is a SPAD device, for example.

FIG. 1 indicates an X axis, a Y axis, and a Z axis that are perpendicular to one another. X and Y directions correspond to the transverse (horizontal) direction, and a Z direction corresponds to the longitudinal (vertical) direction. Further, the positive Z direction corresponds to the upward direction, and the negative Z direction corresponds to the downward direction. The negative Z direction may or may not coincide exactly with the direction of gravity.

As depicted in FIG. 1, the light detection apparatus of this embodiment includes a sensor substrate 10, a circuit substrate 20 provided under the sensor substrate 10, and a multilayer film 30 provided over the sensor substrate 10. The sensor substrate 10 includes a semiconductor substrate 11, an interlayer dielectric film 12, a plurality of contact plugs 13, a wiring layer 14, a plurality of via plugs 15, a plurality of metal pads 16, and a light blocking film 17. The circuit substrate 20 includes a semiconductor substrate 21, an interlayer dielectric film 22, a plurality of contact plugs 23, a wiring layer 24, a plurality of via plugs 25, and a plurality of metal pads 26. The multilayer film 30 includes a planarizing film 31, a filter 32 of each pixel 1, and an on-chip lens 33 of each pixel 1.

FIG. 2 is a transverse sectional view depicting the structure of the light detection apparatus as the first embodiment. FIG. 2 indicates four pixels 1 in the light detection apparatus and four photoelectric conversion units 2 in these pixels 1. FIG. 2 indicates a cross section taken along line I-I' in FIG. 1.

The structure of the light detection apparatus of this embodiment is explained below with reference to FIG. 1. FIG. 2 may also be referenced as needed in the ensuing explanation.

The semiconductor substrate 11 is an Si (silicon) substrate, for example. FIG. 1 indicates a front side (bottom surface) S1 and a back side (top surface) S2 of the semiconductor substrate 11. The light detection apparatus of this embodiment is of a back-illuminated type. The back side S2 serves as a light-receiving surface. As depicted in FIG. 1, each pixel 1 of this embodiment has a well region 11a, a p-type semiconductor region 11b, an n-type semiconductor region 11c, a hole storage region 11d, and a p-type semiconductor region 11e provided inside the semiconductor substrate 11. A pn junction between the regions 11a through 11e forms the photoelectric conversion unit 2 in each pixel 1 of this embodiment inside the semiconductor substrate 11.

The well region 11a is, for example, an n-type semiconductor region or a p-type semiconductor region that includes low-concentration n-type or p-type impurity atoms. The p-type semiconductor region 11b is formed under the well region 11a. The n-type semiconductor region 11c is formed under the well region 11a and the p-type semiconductor region 11b. As such, the n-type semiconductor region 11c functions as a cathode of the photoelectric conversion unit 2. As depicted in FIGS. 1 and 2, the well region 11a is also formed on the side of the p-type semiconductor region 11b and of the n-type semiconductor region 11c.

The hole storage region 11d includes a portion formed over the well region 11a and a portion formed on the side of the well region 11a. The p-type semiconductor region 11e is formed on the side of the well region 11a under the hole storage region 11d. As such, the p-type semiconductor region 11e functions as an anode of the photoelectric conversion unit 2. As depicted in FIGS. 1 and 2, the p-type semiconductor region 11e has a ring-like shape when viewed from an upper side, surrounding the sides of the n-type semiconductor region 11c via the well region 11a. Likewise, the portion formed on the side of the well region 11a in the hole storage region 11d has a ring-like shape when viewed from above, surrounding the sides of the p-type semiconductor region 11b and the n-type semiconductor region 11c via the well region 11a. The hole storage region 11d is a p-type semiconductor region, for example, and has a function of suppressing generation of a dark current.

The light detection apparatus of this embodiment has a plurality of pixels 1. FIG. 1 depicts one such pixel 1, and FIG. 2 indicates four such pixels 1. Each pixel 1 includes the photoelectric conversion unit 2 that converts light into an electric charge. The photoelectric conversion unit 2 receives light from the back side S2 of the semiconductor substrate 11 to generate a signal charge reflecting the quantity of the received light. The signal charge allows the light detection apparatus of this embodiment to detect the light that is incident on each pixel 1.

The interlayer dielectric film 12 is formed on the front side S1 of the semiconductor substrate 11, i.e., under the semiconductor substrate 11. The contact plugs 13, the wiring layer 14, the via plugs 15, and the metal pads 16 are formed in that order inside the interlayer dielectric film 12 under the semiconductor substrate 11.

FIG. 1 depicts two contact plugs 13. One contact plug 13 is formed under the n-type semiconductor region 11c (cathode), and the other contact plug 13 is formed under the p-type semiconductor region 11e (anode). FIG. 1 further indicates two wires in the wiring layer 14. One wire is formed under the contact plug 13 for the n-type semiconductor region 11c (cathode), and the other wire is formed under the contact plug 13 for the p-type semiconductor region 11e (anode). The via plugs 15 and the metal pads 16 are formed in that order under these wires.

The light blocking film 17 is formed inside the semiconductor substrate 11 and has the function of blocking light. As depicted in FIG. 2, for example, the light blocking film 17 has a grid-like (mesh-like) shape when viewed from above and is interposed between adjacent photoelectric conversion units 2. The light blocking film 17 of this embodiment is formed in such a manner as to be embedded in trenches created inside the semiconductor substrate 11. Since the trenches penetrate the semiconductor substrate 11 in this embodiment, the light blocking film 17 also penetrates the semiconductor substrate 17. Alternatively, the light blocking film 17 may be formed in the trenches via an insulating film (e.g., silicon oxide film). This insulating film functions, together with the light blocking film 17, as a pixel separation film that separates the adjacent pixels 1 (i.e., adjacent photoelectric conversion units 2). The light blocking film 17 will be discussed later in more detail.

The semiconductor substrate 21 is arranged under the semiconductor substrate 11. The semiconductor substrate 21 is an Si substrate, for example. The interlayer dielectric film 22 is formed over the semiconductor substrate 21 and arranged under the interlayer dielectric film 12. In this embodiment, the top surface of the interlayer dielectric film 22 is bonded with the bottom surface of the interlayer dielectric film 12. The contact plugs 23, the wiring layer 24, the via plugs 25, and the metal pads 26 are formed in that order over the semiconductor substrate 21 inside the interlayer dielectric film 22.

FIG. 1 indicates two metal pads 26 and another two metal pads 16. One metal pad 26 is bonded with the metal pad 16 connected electrically with the n-type semiconductor region 11c (cathode), and the other metal pad 26 is bonded with the metal pad 16 connected electrically with the p-type semiconductor region 11e (anode). FIG. 1 further depicts two wires inside the wiring layer 24. One wire is formed under the via plug 25 connected electrically with the n-type semiconductor region 11c (cathode), and the other wire is formed under the via plug 25 connected electrically with the p-type semiconductor region 11e (anode). The contact plugs 23 are formed between these wires on one hand and the semiconductor substrate 21 on the other hand.

The circuit substrate 20 includes, for example, a circuit that receives various signals from the sensor substrate 10 and outputs various signals thereto. This circuit is formed, for example, with various MOS transistors formed over the semiconductor substrate 21 and with diverse wires included in the wiring layer 24.

The planarizing film 31 is formed on the back side S2 of the semiconductor substrate 11, i.e., over the semiconductor substrate 11. In this embodiment, the planarizing film 31 is formed over the semiconductor substrate 11 and the light blocking film 17. This film makes flat the top surface of the back side S2 of the semiconductor substrate 11. The planarizing film 31 is an organic film such as a resin film, for example.

The filter 32, formed over the planarizing film 31, serves to let the light of a given wavelength pass through. For example, the filters 32 for red, green, and blue may be arranged over the photoelectric conversion units 2 in the red, green, and blue pixels 1, respectively. Also, the filter 32 for infrared light may be arranged over the photoelectric conversion unit 2 in the infrared light pixel 1. On the other hand, if there is no need to limit the wavelengths of the light that is to be incident on the photoelectric conversion unit 2, the filter 32 may not be formed between the planarizing film 31 and the on-chip lens 33. The light passing through each filter 32 enters the photoelectric conversion unit 2 via the planarizing film 31.

The on-chip lens 33, formed over the filter 32, serves to focus the incident light. The light focused by the on-chip lens 33 enters the photoelectric conversion unit 2 via the filter 32 and the planarizing film 31.

FIG. 3 is another longitudinal sectional view depicting the structure of the light detection apparatus as the first embodiment. FIG. 3 indicates two pixels 1 in the light detection apparatus, two photoelectric conversion units 2 in these pixels 1, and the light blocking film 17 between these photoelectric conversion units 2. For simple explanation below, FIG. 3 does not illustrate the regions 11a through 11e inside the semiconductor substrate 11 (the same also applies to the subsequent drawings).

As depicted in FIG. 3, the light blocking film 17 of this embodiment includes a low-absorption film 41 and a high-absorption film 42 formed in that order in and over the semiconductor substrate 11. The low-absorption film 41 is formed in trenches and outside the semiconductor substrate 11. The high-absorption film 42 is formed in trenches and inside the semiconductor substrate 11. The low-absorption film 41 is an example of the first film claimed in the present disclosure. The high-absorption film 42 is an example of the second film claimed in this disclosure.

The low-absorption film 41 is formed on the side of the semiconductor substrate 11, over the top surface of the interlayer dielectric film 12, and over the top surface (back side S2) of the semiconductor substrate 11. The low-absorption film 41 is a film that has a low light absorption rate (emissivity). For example, the low-absorption film 41 is a metal film that includes Al (aluminum) or Cu (copper). Examples of such a metal film are an Al film and a Cu film. The low-absorption film 41 of this embodiment is an Al film, for example, preferably with a film thickness of at least 5 nm.

The high-absorption film 42 is formed on the side of the semiconductor substrate 11, over the top surface of the interlayer dielectric film 12, and over the top surface (back side S2) of the semiconductor substrate 11 via the low-absorption film 41. The high-absorption film 42 is thus formed over the top surface and on the side of the low-absorption film 41 inside the semiconductor substrate 11, and over the top surface of the low-absorption film 41 outside the semiconductor substrate 11. The high-absorption film 42 is a film that has a high light absorption rate higher than that of the low-absorption film 41. Consequently, the absorption rate of the high-absorption film 42 absorbing the light of a given wavelength is higher than that of the low-absorption film 41 absorbing the light of the same wavelength. For example, the high-absorption film 42 is a metal film that includes W (tungsten), Ti (titanium), or Cr (chrome). Examples of such a metal film are a W film, a Ti film, and a Cr film. The high-absorption film 42 of this embodiment is a W film, for example. In this case, the W film is highly absorbent of near-infrared light.

Each photoelectric conversion unit 2 of this embodiment is used to detect near-infrared light for conversion into an electric charge, for example. Given the light with a wavelength of 900 nm, for example, the Al film and the Cu film provide an emissivity of approximately 0.01 to 0.3; and the W film, Ti film, and Cr film provide an emissivity of approximately 0.3 to 0.7.

FIG. 3 depicts light L1 incident on the low-absorption film 41 and light L2 (reflected light) reflected by the low-absorption film 41. Since the low-absorption film 41 has a low light absorption rate, the light reflectance of the low-absorption film 41 is high. The high reflectance prevents much of the light L1 from being absorbed by the low-absorption film 41, thereby forming the reflected light L2. This makes it possible to improve the photoelectric conversion efficiency of the photoelectric conversion unit 2 in each pixel 1. For example, if the low-absorption film 41 is an Al film with a film thickness of at least 5 nm, the low-absorption film 41 can effectively reflect the light L1.

FIG. 3 further depicts light L3 incident on the high-absorption film 42 and light L4 (transmitted light) passing through the high-absorption film 42. When the low-absorption film 41 is formed in a manner including a crystal grain boundary as in the case where the Al film is used as the low-absorption film 41, the low-absorption film 41 is not fully formed in the crystal grain boundary. In this case, there is a possibility that the light L1 incident on the low-absorption film 41 may pass therethrough by way of the crystal grain boundary. As a result, part of the light L1 passes through the low-absorption film 41 and enters the high-absorption film 42 as the light L3. If the light L3 passes through the light blocking film 17, light leaks would occur between the pixels 1, causing light mixing therebetween.

However, the high-absorption film 42 with its high light absorption rate absorbs much of the light L3. The high-absorption film 42 thus effectively blocks the light L3 from passing therethrough, effectively suppressing generation of the transmitted light L4. This makes it possible to improve the light blocking effect between the pixels 1. For this reason, FIG. 3 uses a dotted arrow to indicate the transmitted light L4.

According to this embodiment, as discussed above, the low-absorption film 41 and the high-absorption film 42 combine to form the light blocking film 17, thereby improving both the light blocking effect between the pixels 1 and the photoelectric conversion efficiency of each pixel 1. That is, this embodiment can reap the advantages of both the low-absorption film 41 and the high-absorption film 42.

FIG. 4 illustrates longitudinal sectional views depicting the structures of light detection apparatuses as two comparative examples with respect to the first embodiment.

In FIG. 4, A depicts a light detection apparatus as a first comparative example. The light blocking film 17 of this comparative example includes only the high-absorption film 42. In this case, the high-absorption film 42 with its high light absorption rate absorbs much of the light L1. For this reason, A in FIG. 4 uses a dotted arrow to indicate the reflected light L2. According to this comparative example, the photoelectric conversion efficiency of the photoelectric conversion unit 2 in each pixel 1 is reduced.

In FIG. 4, B depicts a light detection apparatus as a second comparative example. The light blocking film 17 of this comparative example includes only the low-absorption film 41. In this case, the low light absorption rate of the low-absorption film 41 resolves the problem of the first comparative example. However, when the low-absorption film 41 is formed in a manner including a crystal grain boundary as in the case where the low-absorption film 41 is the Al film, part of the light L3 passes through the low-absorption film 41 to leak out as transmitted light L4. According to this comparative example, a reduction in the light blocking effect of the light blocking film 17 brings about color mixing between the pixels 1.

According to the embodiment of this disclosure, by contrast, the low-absorption film 41 and the high-absorption film 42 combine to form the light blocking film 17 that can resolve not only the problem of the first comparative example but also that of the second comparative example.

FIGS. 5 and 6 give longitudinal sectional views depicting the method of manufacturing the light detection apparatus as the first embodiment.

First, a plurality of photoelectric conversion units 2 are formed inside the semiconductor substrate 11. The interlayer dielectric film 12 is formed on the front side S1 of the semiconductor substrate 11. Trenches T1 are then formed by dry etching from the back side S2 of the semiconductor substrate 11 into the semiconductor substrate 11 (A in FIG. 5). With the back side S2 of the semiconductor substrate 11 facing upward, the trenches T1 of this embodiment are formed to penetrate the semiconductor substrate 11 with the interlayer dielectric film 12 being used as an etching stopper. Further, the trenches T1 of this embodiment are formed between adjacent photoelectric conversion units 2 in a manner constituting a grid-like (mesh-like) shape when viewed from above.

Meanwhile, the photoelectric conversion units 2 and the interlayer dielectric film 12 of this embodiment are formed with the front side S1 of the semiconductor substrate 11 facing upward. The photoelectric conversion units 2 are formed by forming the regions 11a through 11e inside the semiconductor substrate 11 (see FIG. 1). As with the interlayer dielectric film 12, the contact plugs 13, the wiring layer 14, the via plugs 15, and the metal pads 16 are formed on the front side S1 of the semiconductor substrate 11. Likewise, the interlayer dielectric film 22, the contact plugs 23, the wiring layer 24, the via plugs 25, and the metal pads 26 are formed over the semiconductor substrate 21. Thereafter, the sensor substrate 10 and the circuit substrate 20 are bonded together. The trenches T1 of this embodiment are formed after the bonding, for example.

The low-absorption film 41 is then formed all over the semiconductor substrate 11 (B in FIG. 5). As a result, the low-absorption film 41 is formed on the side of the semiconductor substrate 11 in the trenches T1, over the top surface of the interlayer dielectric film 12 in the trenches T1, and over the top surface (back side S2) of the semiconductor substrate 11. The low-absorption film 41 of this embodiment is formed in such a manner that the trenches T1 are not fully filled.

The high-absorption film 42 is then formed all over the semiconductor substrate 11 (A in FIG. 6). As a result, the high-absorption film 42 is formed on the side of the semiconductor substrate 11 in the trenches T1, over the top surface of the interlayer dielectric film 12 in the trenches T1, and over the top surface (back side S2) of the semiconductor substrate 11 via the low-absorption film 41. The high-absorption film 42 of this embodiment is formed in such a manner that the trenches T1 are fully filled.

As described above, the low-absorption film 41 and the high-absorption film 42 of this embodiment are formed in that order in and over the semiconductor substrate 11. In the case where the light blocking film 17 is formed inside the semiconductor substrate 11 via the above-mentioned insulating films, the insulating films, the low-absorption film 41, and the high-absorption film 42 are formed in that order in and over the semiconductor substrate 11 in the processes depicted in B in FIG. 5 and A in FIG. 6.

The low-absorption film 41 and the high-absorption film 42 outside the semiconductor substrate 11 are then partially removed by etching (B in FIG. 6). Specifically, the low-absorption film 41 and the high-absorption film 42 over the photoelectric conversion unit 2 in each pixel 1 are removed so as to form openings in the low-absorption film 41 and the high-absorption film 42 through which light is allowed to enter the photoelectric conversion unit 2 in each pixel 1. As a result, the light blocking film 17 that includes the low-absorption film 41 and the high-absorption film 42 is formed in and over the semiconductor substrate 11.

Thereafter, the planarizing film 31, the filter 32, and the on-chip lens 33 in the multilayer film 30 are formed in that order on the back side S2 of the semiconductor substrate 11 (see FIG. 1). This is how the light detection apparatus of this embodiment is manufactured.

Whereas the trenches T1 of this embodiment are formed from the back side S2 of the semiconductor substrate 11 into the semiconductor substrate 11, the trenches T1 may alternatively be formed from the front side S1 of the semiconductor substrate 11 into the semiconductor substrate 11. Likewise, whereas the light blocking film 17 of this embodiment is formed from the back side S2 of the semiconductor substrate 11 into the trenches T1, the light blocking film 17 may alternatively be formed from the front side S1 of the semiconductor substrate 11 into the trenches T1.

FIG. 7 is a longitudinal sectional view depicting the structure of a light detection apparatus as an alternative example of the first embodiment.

The light detection apparatus of this alternative example includes the sensor substrate 10 and the multilayer film 30 but not the circuit substrate 20. The semiconductor substrate 11 of the alternative example has the same structure as that of the semiconductor substrate 11 of the first embodiment. It is to be noted, however, that the light detection apparatus of the alternative example is of a front-illuminated type with the front side S1 serving as a light-receiving surface. The light detection apparatus of the alternative example thus has the multilayer film 30 on the front side S1 of the semiconductor substrate 11. In this alternative example, the sensor substrate 10 does not have the via plugs 15 and the metal pads 16, and the multilayer film 30 does not include the planarizing film 31.

As in the case of the light detection apparatus of the first embodiment, the light detection apparatus of the alternative example has the light blocking film 17 inside the semiconductor substrate 11. As with the light blocking film 17 of the first embodiment, the light blocking film 17 of the alternative example has the structure depicted in FIG. 3 and can be manufactured by the method illustrated in FIGS. 5 and 6. This alternative example thus provides advantageous effects similar to those of the first embodiment.

As discussed above, the light blocking film 17 of this embodiment includes the low-absorption film 41 inside the semiconductor substrate 11 and the high-absorption film 42 inside the semiconductor substrate 11 via the low-absorption film 41. Thus, this embodiment can improve both the light blocking effect between the pixels 1 and the photoelectric conversion efficiency of each pixel 1.

Second Embodiment

FIG. 8 is a longitudinal sectional view depicting the structure of a light detection apparatus as a second embodiment.

As with the light blocking film 17 of the first embodiment, the light blocking film 17 of this embodiment is formed in such a manner as to be embedded in trenches formed inside the semiconductor substrate 11. However, since the trenches do not penetrate the semiconductor substrate 11 in this embodiment, the light blocking film 17 does not penetrate the semiconductor substrate 17 either. As a result, the bottom surface of the light blocking film 17 in this embodiment does not reach the interlayer dielectric film 12 and is in contact with the semiconductor substrate 11.

As with the light detection apparatus of the first embodiment, the light detection apparatus of this embodiment can be manufactured by the method illustrated in FIGS. 5 and 6. It is to be noted, however, that the trenches T1 depicted in A in FIG. 5 are formed in a manner not penetrating the semiconductor substrate 11 during manufacture of the light detection apparatus of this embodiment. This makes it possible to form the light blocking film 17 not penetrating the semiconductor substrate 11.

Third Embodiment

FIG. 9 is a longitudinal sectional view depicting the structure of a light detection apparatus as a third embodiment.

As depicted in FIG. 9, the light blocking film 17 of this embodiment includes the low-absorption film 41, an intermediate film 43, and the high-absorption film 42 formed in that order in and over the semiconductor substrate 11. The low-absorption film 41 is formed on the side of the semiconductor substrate 11, over the top surface of the interlayer dielectric film 12, and over the top surface of the semiconductor substrate 11. The intermediate film 43 is formed on the side and over these top surfaces via the low-absorption film 41. The high-absorption film 42 is formed on the side and over these top surfaces via the low-absorption film 41 and the intermediate film 43. The intermediate film 43 is thus interposed between the low-absorption film 41 and the high-absorption film 42. The intermediate film 43 is an example of the third film claimed in the present disclosure.

The intermediate film 43 is formed, for example, in a case where it is desired to avoid contact between the low-absorption film 41 and the high-absorption film 42 or in a case where the film quality of the high-absorption film 42 is desired to be improved. The intermediate film 43 is an insulating film or a metal film, for example. Examples of the insulating film are an insulating film that includes silicon and an insulating film that includes metal elements. Examples of the metal film, meanwhile, are a metal film that includes single metal or a metal film that includes a metal compound.

As with the light detection apparatus of the first embodiment, the light detection apparatus of this embodiment can be manufactured by the method illustrated in FIGS. 5 and 6.

It is to be noted, however, that during manufacture of the light detection apparatus of this embodiment, the intermediate film 43 is formed all over the semiconductor substrate 11 between the process in B in FIG. 5 and the process in A in FIG. 6. This makes it possible to form the light blocking film 17 that includes the intermediate film 43.

FIG. 10 is a longitudinal sectional view depicting the structure of a light detection apparatus as an alternative example of the third embodiment.

As depicted in FIG. 10, the light blocking film 17 of this alternative example includes a barrier metal film 44, the low-absorption film 41, a barrier metal film 45, and the high-absorption film 42 formed in that order in and over the semiconductor substrate 11. The barrier metal film 44 is formed on the side of the semiconductor substrate 11, over the top surface of the interlayer dielectric film 12, and over the top surface of the semiconductor substrate 11. The low-absorption film 41 is formed on the side and over these top surfaces via the barrier metal film 44. The barrier metal film 45 is formed on the side and over these top surfaces via the barrier metal film 44 and the low-absorption film 41. The high-absorption film 42 is formed on the side and over these top surfaces via the barrier metal film 44, the low-absorption film 41, and the barrier metal film 45. The barrier metal film 44 is thus interposed between the semiconductor substrate 11 and the low-absorption film 41, and the barrier metal film 45 is interposed between the low-absorption film 41 and the high-absorption film 42. The barrier metal film 44 is an example of the fourth film claimed in the present disclosure. The barrier metal film 45 is an example of the fifth film claimed in this disclosure.

The barrier metal film 44 is formed, for example, in a case where it is desired to suppress diffusion of metal atoms (Al atoms) from the low-absorption film 41. An example of the barrier metal film 44 is a metal film that includes Ti (titanium) or Ta (tantalum).

The barrier metal film 45 is formed, for example, in a case where it is desired to suppress diffusion of metal atoms (W atoms) from the high-absorption film 42. An example of the barrier metal film 45 is a metal film that includes Ti or Ta. In this alternative example, the intermediate film 43 (e.g., aluminum oxide film) may be formed between the low-absorption film 41 and the barrier metal film 45. This makes it possible to avoid contact between the low-absorption film 41 and the barrier metal film 45, for example.

As with the light detection apparatus of the first embodiment, the light detection apparatus of this alternative example can be manufactured by the method illustrated in FIGS. 5 and 6. It is to be noted, however, that the barrier metal film 44 is formed all over the semiconductor substrate 11 between the process in A in FIG. 5 and the process in B in FIG. 5 and that the barrier metal film 45 is formed all over the semiconductor substrate 11 between the process in B in FIG. 5 and the process in A in FIG. 6 during manufacture of the light detection apparatus of this alternative example. This makes it possible to form the light blocking film 17 that includes the barrier metal films 44 and 45.

Fourth Embodiment

FIG. 11 is a plan view schematically depicting the structure of a light detection apparatus as a fourth embodiment.

FIG. 11 indicates a pixel array region R1 and a peripheral region R2 inside the semiconductor substrate 11. The pixel array region R1 is an example of the first region claimed in the present disclosure. The peripheral region R2 is an example of the second region claimed in this disclosure.

As depicted in FIG. 11, the light detection apparatus of this embodiment has pixel arrays that include a plurality of pixels 1. The pixel array region R1 includes these pixels 1. Specifically, the pixel array region R1 includes the photoelectric conversion units 2 of these pixels 1 inside the semiconductor substrate 11. The photoelectric conversion units 2 of these pixels 1 will be discussed later with reference to FIG. 12.

The peripheral region R2 circularly surrounds the pixel array region R1 when viewed from above. The peripheral region R2 does not include the pixels 1 of the above-mentioned pixel arrays. The pixel array region R1 and the peripheral region R2 will also be discussed later in more detail with reference to FIG. 12.

FIG. 12 is a longitudinal sectional view depicting the structure of the light detection apparatus as the fourth embodiment. FIG. 12 indicates three pixels 1 in the light detection apparatus, three photoelectric conversion units 2 in these pixels 3, and the light blocking film 17 between these photoelectric conversion units 2. As with FIG. 3 and other drawings, FIG. 12 does not illustrate the regions 11a through 11e inside the semiconductor substrate 11.

FIG. 12 depicts the above-described pixel array region R1 and peripheral region R2. The three pixels 1 (photoelectric conversion units 2) in FIG. 12 are included in the pixel array region R1. Meanwhile, the peripheral region R2 does not include the pixels 1 (photoelectric conversion units 2).

FIG. 12 depicts three portions of one light blocking film 17. The light blocking film 17 of this embodiment includes not only the portions in the pixel array region R1 but also those interposed between the pixel array region R1 and the peripheral region R2. The portions in the pixel array region R1 include the portions between the photoelectric conversion units 2 inside the semiconductor substrate 11 and those outside and on the back side of the semiconductor substrate 11, as in the case of the light blocking film 17 of the first through third embodiments. On the other hand, the portions between the pixel array region R1 and the peripheral region R2 include a portion P1 between the pixel array region R1 and the peripheral region R2 inside the semiconductor substrate 11 and a portion P2 outside the semiconductor substrate 11 and on the back side S2 thereof. As depicted in FIG. 12, the portion P2 is formed all over the top surface of the peripheral region R2. The portion P1 is an example of the first portion claimed in the present disclosure. The portion P2 is an example of the second portion claimed in this disclosure.

As with the light blocking film 17 of the first embodiment, the light blocking film 17 of this embodiment includes the low-absorption film 41 and the high-absorption film 42 formed in that order in and over the semiconductor substrate 11. For example, the portion P1 includes the low-absorption film 41 formed on the side of the semiconductor substrate 11 and over the top surface of the interlayer dielectric film 12, and the high-absorption film 42 formed on the side and over the top surface via the low-absorption film 41. Similarly, the portion P2 includes the low-absorption film 41 and the high-absorption film 42 formed in that order over the top surface of the semiconductor substrate 11.

If the light blocking film 17 of this embodiment did not include the portion P2, the light incident on the top surface of the peripheral region R2 (back side S2 of the semiconductor substrate 11) would reflect, possibly causing a flare. According to this embodiment, the top surface of the peripheral region R2 is covered with the portion P2 of the light blocking film 17 to suppress the reflection of light from the top surface of the peripheral region R2, which prevents flares.

As with the light detection apparatus of the first embodiment, the light detection apparatus of this embodiment can be manufactured by the method illustrated in FIGS. 5 and 6. It is to be noted, however, that the trenches T1 are also formed between the pixel array region R1 and the peripheral region R2 in the process in A in FIG. 5 and that the low-absorption film 41 and the high-absorption film 42 are left intact over the top surface of the peripheral region R2 in the process in B in FIG. 6 during manufacture of the light detection apparatus of this embodiment. This makes it possible to form the light blocking film 17 that includes the portions P1 and P2.

The light blocking film 17 of this embodiment may have the same structure as that of the light blocking film 17 of the second, third, or fourth embodiment. In this case, the portions P1 and P2 of the light blocking film 17 of this embodiment are formed to have the same structure as that of the portions P1 and P2 of the light blocking film 17 of the second, third, or fourth embodiment.

Application Examples

FIG. 13 is a block diagram depicting a configuration example of electronic equipment. The electronic equipment in FIG. 13 is a camera 100.

The camera 100 includes an optical unit 101 including a lens group, an imaging apparatus 102 as the light detection apparatus of any one of the first through fourth embodiments, a DSP (Digital Signal Processor) circuit 103 as a camera signal processing circuit, a frame memory 104, a display unit 105, a recording unit 106, an operation unit 107, and a power supply unit 108. The DSP circuit 103, the frame memory 104, the display unit 105, the recording unit 106, the operation unit 107, and the power supply unit 108 are interconnected via a bus line 109.

The optical unit 101 captures the incident light (image light) from a subject and forms an image on an imaging plane of the imaging apparatus 102. The imaging apparatus 102 converts the quantity of the incident light formed as the image on the imaging plane by the optical unit 101 into electrical signals in increments of pixels, and outputs the electrical signals as pixel signals.

The DSP circuit 103 performs signal processing on the pixel signals output from the imaging apparatus 102. The frame memory 104 is a memory that stores a single frame of a video or a still image captured by the imaging apparatus 102.

The display unit 105 includes, for example, a panel-type display apparatus such as a liquid crystal display or an organic EL display, which displays videos or still images captured by the imaging apparatus 102. The recording unit 106 records the videos or still images captured by the imaging apparatus 102 in a recording medium such as a hard disk or a semiconductor memory.

When operated by a user, the operation unit 107 issues operational commands with respect to diverse functions provided by the camera 100. The power supply unit 108 provides various power supplies as the operating power targeted to the DSP circuit 103, the frame memory 104, the display unit 105, the recording unit 106, and the operation unit 107 as needed.

Any one of the light detection apparatuses of the first through fourth embodiments may be used as the imaging apparatus 102 that is expected to enable the capture of high-quality images.

This solid-state imaging apparatus can be applied to diverse other products. For example, the solid-state imaging apparatus may be mounted on such mobile objects as automobiles, electric vehicles, hybrid electric vehicles, motorcycles, bicycles, personal mobility devices, aircraft, drones, ships, and robots.

FIG. 14 is a block diagram depicting a configuration example of a mobile object control system. The mobile object control system in FIG. 14 is a vehicle control system 200.

The vehicle control system 200 includes a plurality of electronic control units connected via a communication network 201. In the example depicted in FIG. 14, the vehicle control system 200 includes a driving system control unit 210, a body system control unit 220, an outside-vehicle information detecting unit 230, an in-vehicle information detecting unit 240, and an integrated control unit 250. FIG. 14 further indicates a microcomputer 251, a sound/image output section 252, and a vehicle-mounted network I/F (Interface) 253 as components of the integrated control unit 250.

The driving system control unit 210 controls the operations of apparatuses related to the driving system of the vehicle in accordance with various programs. For example, the driving system control unit 210 functions as a control apparatus that controls a drive power generating apparatus for generating vehicle drive power such as an internal combustion engine or a driving motor, a drive power transmission mechanism for transmitting the drive power to the wheels, a steering mechanism for adjusting the steering angle of the vehicle, and a braking apparatus for generating the braking force for the vehicle.

The body system control unit 220 controls the operations of various apparatuses mounted on the vehicle body, in accordance with various programs. For example, the body system control unit 220 functions as a control apparatus that controls a smart key system, a keyless entry system, power window apparatuses, and various lamps (e.g., headlamps, back lamps, brake lamps, winkers, and fog lamps). In this case, the body system control unit 220 may receive input of radio waves from a portable device acting as an alternative key or input of signals from various switches. Given the input of such radio waves or signals, the body system control unit 220 controls the door lock apparatus, power window apparatuses, and lamps of the vehicle, among others.

The outside-vehicle information detecting unit 230 detects information from outside of the vehicle carrying the vehicle control system 200. The outside-vehicle information detecting unit 230 is connected with an imaging section 231, for example. The outside-vehicle information detecting unit 230 causes the imaging section 231 to capture external images and receives the captured images from the imaging section 231. In reference to the received images, the outside-vehicle information detecting unit 230 may perform an object detection process or a distance detection process to detect the presence of, or the distance to, such objects as pedestrians, vehicles, obstacles, traffic signs, and road surface markings.

The imaging section 231 is an optical sensor that receives light and outputs an electrical signal reflecting the quantity of the received light. The imaging section 231 can output the electrical signal either as an image or as distance measurement information. The light received by the imaging section

231 may be either visible light or invisible light such as infrared rays. The imaging section 231 includes one of the light detection apparatuses of the first through fourth embodiments.

The in-vehicle information detecting unit 240 detects information from inside of the vehicle carrying the vehicle control system 200. The in-vehicle information detecting unit 240 is connected with a driver state detecting section 241 that detects the state of the driver, for example. The driver state detecting section 241 may include a camera that takes images of the driver, for example. In reference to the detection information input from the driver state detecting section 241, the in-vehicle information detecting unit 240 may calculate the degree of fatigue or the degree of concentration of the driver, or may determine whether the driver is nodding off. This camera may include any one of the light detection apparatuses of the first through fourth embodiments. For example, the camera 100 depicted in FIG. 13 may be used.

The microcomputer 251 may output control commands to the driving system control unit 210 by calculating control target values for the drive power generation apparatus, the steering mechanism, or the braking apparatus in reference to the information acquired outside or inside the vehicles by the outside-vehicle information detecting unit 230 or by the in-vehicle information detecting unit 240. For example, the microcomputer 251 can perform coordinated control for the purpose of implementing ADAS (Advanced Driver Assistance System) functions such as collision avoidance and shock mitigation of the vehicle, follow-on driving based on inter-vehicle distance, cruise control, warning of collision danger, and warning of lane departure.

Also, the microcomputer 251 may control the drive power generation apparatus, the steering mechanism, or the braking apparatus in reference to the information acquired from around the vehicle by the outside-vehicle information detecting unit 230 or by the in-vehicle information detecting unit 240. This allows the microcomputer 251 to carry out coordinated control for automated driving, i.e., autonomous travel without recourse to the driver's intervention.

In reference to the information regarding what is outside the vehicle obtained by the outside-vehicle information detecting unit 230, the microcomputer 251 may issue control commands to the body system control unit 220. For example, the microcomputer 251 may perform coordinated control for anti-glare involving switching from low to high beam by controlling the headlamps in keeping with the position of the vehicle ahead or of a coming vehicle detected by the outside-vehicle information detecting unit 230.

The sound/image output section 252 transmits at least either a sound output signal or an image output signal to an output apparatus that can visibly or audibly convey information to persons on board the vehicle or to the outside of the vehicle. In the example in FIG. 14, such an output apparatus is embodied by audio speakers 261, a display section 262, and an instrument panel 263. The display section 262 may include an onboard display or a head-up display, for example.

FIG. 15 is a plan view depicting a specific example of positions where the image pickup unit in FIG. 14 is set up.

A vehicle 300 indicated in FIG. 15 includes the imaging section 231 deployed as image pickup units 301, 302, 303, 304 and 305. For example, the image pickup units 301, 302, 303, 304 and 305 are respectively mounted on the front nose, on the side mirrors, on the rear bumper, on the back door, and at the top of the windshield inside the vehicle.

The image pickup unit 301 mounted on the front nose primarily captures images of what is ahead of the vehicle 300. The image pickup units 302 and 303 mounted on the left and right side mirrors primarily capture images of what is on the left and right sides of the vehicle 300, respectively. The image pickup unit 304 mounted on the rear bumper or on the back door primarily captures images of what is behind the vehicle 300. The image pickup unit 305 on the windshield top inside the vehicle primarily captures images of what is ahead of the vehicle 300. The image pickup unit 305 is used primarily to detect the vehicle ahead, pedestrians, obstacles, traffic lights, traffic signs, and lanes, for example.

FIG. 15 also illustrates imaging ranges of the image pickup units 301, 302, 303 and 304 (referred to as the image pickup units 301 through 304 hereunder). An imaging range 311 is covered by the image pickup unit 301 mounted on the front nose. An imaging range 312 is covered by the image pickup unit 302 mounted on left side mirror. An imaging range 313 is covered by the image pickup unit 303 mounted on the right side mirror. An imaging range 314 is covered by the image pickup unit 304 mounted on the rear bumper or on the back door. For example, the pieces of image data acquired by the image pickup units 301 through 304 may be overlaid with one another to provide a bird's-eye view of the vehicle 300 as viewed from above. The imaging ranges 311, 312, 313 and 314 will be referred to as the "imaging ranges 311 through 314" hereunder.

At least one of the image pickup units 301 through 304 may be equipped with a function of acquiring distance information. For example, at least one of the image pickup units 301 through 304 may be a stereo camera that includes a plurality of imaging apparatuses or an imaging apparatus that has pixels for phase difference detection.

For example, in reference to the distance information obtained from the image pickup units 301 through 304, the microcomputer 251 (FIG. 14) calculates the distance to each solid object within the imaging ranges 311 through 314 as well as changes in the distance over time (relative velocity to the vehicle 300). In reference to such calculation results, the microcomputer 251 can extract, in the form of the vehicle ahead, a solid object traveling approximately in the same direction and on the same road as the vehicle 300 at a predetermined speed (e.g., more than 0 km/h). Further, the microcomputer 251 may set beforehand an inter-vehicle distance to be secured with respect to the vehicle ahead and thereby perform automatic brake control (including follow-up stop control) and automatic acceleration control (including follow-up start control). With this example, it is possible to perform coordinated control to implement self-driving for autonomous travel free of driver intervention.

For example, in reference to the distance information acquired from the image pickup units 301 through 304, the microcomputer 251 can categorize pieces of solid object-related data into motorcycles, standard-sized vehicles, large-sized vehicles, pedestrians, utility poles, and other solid objects and extract the categorized objects for use in automatic avoidance of obstacles. For example, the microcomputer 251 distinguishes the obstacles around the vehicle 300 into those that are visible to the driver of the vehicle 300 and those difficult for the driver to see. The microcomputer 251 then determines a collision risk, i.e., the level of risk of collision with each obstacle. In a situation where there is a possibility of collision because the collision risk is at or higher than a predetermined setting, the microcomputer 251 may output a warning to the driver via the audio speakers 261 or the display section 262 or may cause the driving system control unit 210 to perform forced deceleration or collision avoidance steering, thereby assisting the driver in avoiding collisions with the obstacles.

At least one of the image pickup units 301 through 304 may be an infrared ray camera that detects infrared light. For example, the microcomputer 251 can recognize pedestrians by determining whether or not there are any pedestrians in the images captured by the image pickup units 301 through 304. Recognition of pedestrians is performed, for example, by two procedures: a procedure of extracting feature points from the images captured by the image pickup units 301 through 304 serving as infrared ray cameras, and a procedure of carrying out pattern matching processing on a series of feature points indicative of object contours to see if any object is a pedestrian. When the microcomputer 251 determines that there is a pedestrian in the images captured by the image pickup units 301 through 304, the sound/image output section 252 controls the display section 262 to have rectangular contour lines displayed superimposed for emphasis on the recognized pedestrian. Also, the sound/image output section 252 may control the display section 262 to display, for example, an icon indicating the pedestrian in a desired position.

FIG. 16 is a view depicting an example of a schematic configuration of an endoscopic surgery system to which the technology according to an embodiment of the present disclosure (present technology) can be applied.

In FIG. 16, a state is illustrated in which a surgeon (medical doctor) 531 is using an endoscopic surgery system 400 to perform surgery for a patient 532 on a patient bed 533. As depicted, the endoscopic surgery system 400 includes an endoscope 500, other surgical tools 510 such as a pneumoperitoneum tube 511 and an energy device 512, a supporting arm apparatus 520 which supports the endoscope 500 thereon, and a cart 600 on which various apparatus for endoscopic surgery are mounted.

The endoscope 500 includes a lens barrel 501 having a region of a predetermined length from a distal end thereof to be inserted into a body cavity of the patient 532, and a camera head 502 connected to a proximal end of the lens barrel 501. In the example depicted, the endoscope 500 is depicted which includes as a rigid endoscope having the lens barrel 501 of the hard type. However, the endoscope 500 may otherwise be included as a flexible endoscope having the lens barrel 501 of the flexible type.

The lens barrel 501 has, at a distal end thereof, an opening in which an objective lens is fitted. A light source apparatus 603 is connected to the endoscope 500 such that light generated by the light source apparatus 603 is introduced to a distal end of the lens barrel 501 by a light guide extending in the inside of the lens barrel 501 and is irradiated toward an observation target in a body cavity of the patient 532 through the objective lens. It is to be noted that the endoscope 500 may be a forward-viewing endoscope or may be an oblique-viewing endoscope or a side-viewing endoscope.

An optical system and an image pickup element are provided in the inside of the camera head 502 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 601.

The CCU 601 includes a central processing unit (CPU), a graphics processing unit (GPU) or the like and integrally controls operation of the endoscope 500 and a display apparatus 602. Further, the CCU 601 receives an image signal from the camera head 502 and performs, for the image signal, various image processes for displaying an image based on the image signal such as, for example, a development process (demosaic process).

The display apparatus 602 displays thereon an image based on an image signal, for which the image processes have been performed by the CCU 601, under the control of the CCU 601.

The light source apparatus 603 includes a light source such as, for example, a light emitting diode (LED) and supplies irradiation light upon imaging of a surgical region to the endoscope 500.

An inputting apparatus 604 is an input interface for the endoscopic surgery system 11000. A user can perform inputting of various kinds of information or instruction inputting to the endoscopic surgery system 400 through the inputting apparatus 604. For example, the user would input an instruction or a like to change an image pickup condition (type of irradiation light, magnification, focal distance or the like) by the endoscope 500.

A treatment tool controlling apparatus 605 controls driving of the energy device 512 for cautery or incision of a tissue, sealing of a blood vessel or the like. A pneumoperitoneum apparatus 606 feeds gas into a body cavity of the patient 532 through the pneumoperitoneum tube 511 to inflate the body cavity in order to secure the field of view of the endoscope 500 and secure the working space for the surgeon. A recorder 607 is an apparatus capable of recording various kinds of information relating to surgery. A printer 608 is an apparatus capable of printing various kinds of information relating to surgery in various forms such as a text, an image or a graph.

It is to be noted that the light source apparatus 603 which supplies irradiation light when a surgical region is to be imaged to the endoscope 500 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 603. Further, in this case, if laser beams from the respective RGB laser light sources are irradiated time-divisionally on an observation target and driving of the image pickup elements of the camera head 502 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 603 may be controlled such that the intensity of light to be outputted is changed for each predetermined time. By controlling driving of the image pickup element of the camera head 502 in synchronism with the timing of the change of the intensity of light to acquire images time-divisionally and synthesizing the images, an image of a high dynamic range free from underexposed blocked up shadows and overexposed highlights can be created.

Further, the light source apparatus 603 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 603 can be configured to supply such narrow-band light and/or excitation light suitable for special light observation as described above.

FIG. 17 is a block diagram depicting an example of a functional configuration of the camera head 502 and the CCU 601 depicted in FIG. 16.

The camera head 502 includes a lens unit 701, an image pickup unit 702, a driving unit 703, a communication unit 704 and a camera head controlling unit 705. The CCU 601 includes a communication unit 711, an image processing unit 712 and a control unit 713. The camera head 502 and the CCU 601 are connected for communication to each other by a transmission cable 700.

The lens unit 701 is an optical system, provided at a connecting location to the lens barrel 501. Observation light taken in from a distal end of the lens barrel 501 is guided to the camera head 502 and introduced into the lens unit 701. The lens unit 701 includes a combination of a plurality of lenses including a zoom lens and a focusing lens.

The image pickup unit 702 includes image pickup elements. The number of image pickup elements which is included by the image pickup unit 702 may be one (single-plate type) or a plural number (multi-plate type). Where the image pickup unit 702 is configured as that of the multi-plate type, for example, image signals corresponding to respective R, G and B are generated by the image pickup elements, and the image signals may be synthesized to obtain a color image. The image pickup unit 702 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 531. It is to be noted that, where the image pickup unit 702 is configured as that of stereoscopic type, a plurality of systems of lens units 701 are provided corresponding to the individual image pickup elements. The image pickup unit 702 is, for example, the light detection apparatus of any one of the first through fourth embodiments.

Further, the image pickup unit 702 may not necessarily be provided on the camera head 502. For example, the image pickup unit 702 may be provided immediately behind the objective lens in the inside of the lens barrel 501.

The driving unit 703 includes an actuator and moves the zoom lens and the focusing lens of the lens unit 701 by a predetermined distance along an optical axis under the control of the camera head controlling unit 705. Consequently, the magnification and the focal point of a picked up image by the image pickup unit 702 can be adjusted suitably.

The communication unit 704 includes a communication apparatus for transmitting and receiving various kinds of information to and from the CCU 601. The communication unit 704 transmits an image signal acquired from the image pickup unit 702 as RAW data to the CCU 601 through the transmission cable 700.

In addition, the communication unit 704 receives a control signal for controlling driving of the camera head 502 from the CCU 601 and supplies the control signal to the camera head controlling unit 705. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 713 of the CCU 601 on the basis of an acquired image signal. In the latter case, an auto exposure (AE) function, an auto focus (AF) function and an auto white balance (AWB) function are incorporated in the endoscope 500.

The camera head controlling unit 705 controls driving of the camera head 502 on the basis of a control signal from the CCU 601 received through the communication unit 704.

The communication unit 711 includes a communication apparatus for transmitting and receiving various kinds of information to and from the camera head 502. The communication unit 711 receives an image signal transmitted thereto from the camera head 502 through the transmission cable 700.

Further, the communication unit 711 transmits a control signal for controlling driving of the camera head 502 to the camera head 502. The image signal and the control signal can be transmitted by electrical communication, optical communication or the like.

The image processing unit 712 performs various image processes for an image signal in the form of RAW data transmitted thereto from the camera head 502.

The control unit 713 performs various kinds of control relating to image picking up of a surgical region or the like by the endoscope 500 and display of a picked up image obtained by image picking up of the surgical region or the like. For example, the control unit 713 creates a control signal for controlling driving of the camera head 502.

Further, the control unit 713 controls, on the basis of an image signal for which image processes have been performed by the image processing unit 712, the display apparatus 602 to display a picked up image in which the surgical region or the like is imaged. Thereupon, the control unit 713 may recognize various objects in the picked up image using various image recognition technologies. For example, the control unit 713 can recognize a surgical tool such as forceps, a particular living body region, bleeding, mist when the energy device 512 is used and so forth by detecting the shape, color and so forth of edges of objects included in a picked up image. The control unit 713 may cause, when it controls the display apparatus 602 to display a picked up image, various kinds of surgery supporting information to be displayed in an overlapping manner with an image of the surgical region using a result of the recognition. Where surgery supporting information is displayed in an overlapping manner and presented to the surgeon 531, the burden on the surgeon 531 can be reduced and the surgeon 531 can proceed with the surgery with certainty.

The transmission cable 700 which connects the camera head 502 and the CCU 601 to each other is an electric signal cable ready for communication of an electric signal, an optical fiber ready for optical communication or a composite cable ready for both of electrical and optical communications.

Here, while, in the example depicted, communication is performed by wired communication using the transmission cable 700, the communication between the camera head 502 and the CCU 601 may be performed by wireless communication.

The present disclosure has been explained above with reference to specific embodiments. These embodiments may be modified diversely without departing from the spirit and scope of this disclosure. For example, two or more of the embodiments may be combined when implemented.

Note that the present disclosure may also be implemented in the following configurations.

(1)

A light detection apparatus including:

a substrate;

a plurality of photoelectric conversion units provided inside the substrate; and a light blocking film provided at least between the photoelectric conversion units inside the substrate, in which the light blocking film includes a first film provided inside the substrate and a second film provided inside the substrate via the first film, and a light absorption rate of the second film is higher than that of the first film.

(2)

The light detection apparatus according to (1), in which the first film includes a metal film.

(3)

The light detection apparatus according to (2), in which the first film includes either Al (aluminum) or Cu (copper).

(4)

The light detection apparatus according to (1), in which a film thickness of the first film is at least 5 nm.

(5)

The light detection apparatus according to (1), in which the second film includes a metal film.

(6)

The light detection apparatus according to (5), in which the second film includes W (tungsten), Ti (titanium), or Cr (chromium).

(7)

The light detection apparatus according to (1), in which the second film is provided over a top surface and on a side of the first film inside the substrate.

(8)

The light detection apparatus according to (1), in which the light blocking film is provided inside the substrate in a manner penetrating the substrate.

(9)

The light detection apparatus according to (1), in which the light blocking film is provided inside the substrate in a manner not penetrating the substrate.

(10)

The light detection apparatus according to (1), in which the light blocking film further includes a third film interposed between the first film and the second film.

(11)

The light detection apparatus according to (10), in which the third film includes either an insulating film or a metal film.

(12)

The light detection apparatus according to (1), in which the light blocking film further includes a fourth film and a fifth film, the first film is provided inside the substrate via the fourth film, and the fifth film is interposed between the first film and the second film.

(13)

The light detection apparatus according to (12), in which the fourth film and the fifth film each function as a barrier metal film.

(14)

The light detection apparatus according to (1), in which the substrate includes a first region that includes the plurality of photoelectric conversion units and a second region that circularly surrounds the first region, and the light blocking film further includes a first portion interposed between the first region and the second region inside the substrate and a second portion provided over the second region outside the substrate.

(15)

The light detection apparatus according to (14), in which the first portion includes the first film provided inside the substrate and the second film provided inside the substrate via the first film, and the second portion includes the first film provided over the substrate and the second film provided over the substrate via the first film.

(16)

A light detection apparatus manufacturing method including:

forming a plurality of photoelectric conversion units inside a substrate; and forming a light blocking film at least between the photoelectric conversion units inside the substrate, in which the light blocking film is formed by forming a first film inside the substrate and by forming a second film inside the substrate via the first film, and a light absorption rate of the second film is higher than that of the first film.

(17)

The light detection apparatus manufacturing method according to (16), in which the light blocking film is formed in a trench formed inside the substrate in a manner penetrating the substrate.

(18)

The light detection apparatus manufacturing method according to (16), in which the light blocking film is formed in a trench formed inside the substrate in a manner not penetrating the substrate.

(19)

The light detection apparatus manufacturing method according to (16), in which the light blocking film is formed by forming the first film, a third film, and the second film, in that order, inside the substrate.

(20)

The light detection apparatus manufacturing method according to (16), in which the light blocking film is formed by forming a fourth film, the first film, a fifth film, and the second film, in that order, inside the substrate.

REFERENCE SIGNS LIST

1: Pixel
2: Photoelectric conversion unit
10: Sensor substrate

11: Semiconductor substrate
11a: Well region
11b: p-type semiconductor region
11c: n-type semiconductor region
11d: Hole storage region
11e: p-type semiconductor region
12: Interlayer dielectric film
13: Contact plug
14: Wiring layer
15: Via plug
16: Metal pad
17 Light blocking film
20: Circuit substrate
21: Semiconductor substrate
22: Interlayer dielectric film
23: Contact plug
24: Wiring layer
25: Via plug
26: Metal pad
30: Multilayer film
31: Planarizing film
32: Filter
33: On-chip lens
41: Low-absorption film
42: High-absorption film
43: Intermediate film
44: Barrier metal film
45: Barrier metal film

The invention claimed is:

1. A light detection apparatus, comprising:
a substrate;
a plurality of photoelectric conversion units provided inside the substrate; and
a light blocking film provided at least between the photoelectric conversion units inside the substrate,
wherein the light blocking film has a grid like shape in a plan view taken along a line normal to a light incident surface of the substrate,
wherein the light blocking film surrounds at least some of the photoelectric conversion units in the plan view taken along the line normal to the light incident surface of the substrate,
wherein the light blocking film includes a first film provided inside the substrate and a second film provided inside the substrate via the first film, and
wherein a light absorption rate of the second film is higher than that of the first film.

2. The light detection apparatus according to claim 1, wherein the first film includes a metal film.

3. The light detection apparatus according to claim 2, wherein the first film includes either Al (aluminum) or Cu (copper).

4. The light detection apparatus according to claim 1, wherein a film thickness of the first film is at least 5 nm.

5. The light detection apparatus according to claim 1, wherein the second film includes a metal film.

6. The light detection apparatus according to claim 5, wherein the second film includes W (tungsten), Ti (titanium), or Cr (chromium).

7. The light detection apparatus according to claim 1, wherein the second film is provided over a top surface and on a side of the first film inside the substrate.

8. The light detection apparatus according to claim 1, wherein the light blocking film is provided inside the substrate in a manner penetrating the substrate.

9. The light detection apparatus according to claim 1, wherein the light blocking film is provided inside the substrate in a manner not penetrating the substrate.

10. The light detection apparatus according to claim 1, wherein the light blocking film further includes a third film interposed between the first film and the second film.

11. The light detection apparatus according to claim 10, wherein the third film includes either an insulating film or a metal film.

12. The light detection apparatus according to claim 1, wherein the light blocking film further includes a fourth film and a fifth film, the first film is provided inside the substrate via the fourth film, and the fifth film is interposed between the first film and the second film.

13. The light detection apparatus according to claim 12, wherein the fourth film and the fifth film each function as a barrier metal film.

14. The light detection apparatus according to claim 1, wherein the substrate includes a first region that includes the plurality of photoelectric conversion units and a second region that circularly surrounds the first region, and the light blocking film further includes a first portion interposed between the first region and the second region inside the substrate and a second portion provided over the second region outside the substrate.

15. The light detection apparatus according to claim 14, wherein the first portion includes the first film provided inside the substrate and the second film provided inside the substrate via the first film, and the second portion includes the first film provided over the substrate and the second film provided over the substrate via the first film.

16. A light detection apparatus manufacturing method, comprising:

forming a plurality of photoelectric conversion units inside a substrate; and forming a light blocking film at least between the photoelectric conversion units inside the substrate, wherein the light blocking film has a grid like shape in a plan view taken along a line normal to a light incident surface of the substrate, wherein the light blocking film surrounds at least some of the photoelectric conversion units in the plan view taken along the line normal to the light incident surface of the substrate, wherein the light blocking film is formed by forming a first film inside the substrate and by forming a second film inside the substrate via the first film, and wherein a light absorption rate of the second film is higher than that of the first film.

17. The light detection apparatus manufacturing method according to claim 16, wherein the light blocking film is formed in a trench formed inside the substrate in a manner penetrating the substrate.

18. The light detection apparatus manufacturing method according to claim 16, wherein the light blocking film is formed in a trench formed inside the substrate in a manner not penetrating the substrate.

19. The light detection apparatus manufacturing method according to claim 16, wherein the light blocking film is formed by forming the first film, a third film, and the second film, in that order, inside the substrate.

20. The light detection apparatus manufacturing method according to claim 16, wherein the light blocking film is formed by forming a fourth film, the first film, a fifth film, and the second film, in that order, inside the substrate.

* * * * *